(12) United States Patent
Osawa et al.

(10) Patent No.: US 9,639,322 B2
(45) Date of Patent: May 2, 2017

(54) VOICE RECOGNITION DEVICE AND DISPLAY METHOD

(71) Applicants: Masanobu Osawa, Tokyo (JP); Yuki Furumoto, Tokyo (JP)

(72) Inventors: Masanobu Osawa, Tokyo (JP); Yuki Furumoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 14/648,935

(22) PCT Filed: Jan. 9, 2013

(86) PCT No.: PCT/JP2013/050203
§ 371 (c)(1),
(2) Date: Jun. 2, 2015

(87) PCT Pub. No.: WO2014/109017
PCT Pub. Date: Jul. 17, 2014

(65) Prior Publication Data
US 2015/0331664 A1 Nov. 19, 2015

(51) Int. Cl.
*G10L 21/00* (2013.01)
*G10L 15/04* (2013.01)
*G06F 17/30* (2006.01)
*G01C 21/00* (2006.01)
*G06F 3/16* (2006.01)
(Continued)

(52) U.S. Cl.
CPC ........... *G06F 3/167* (2013.01); *G01C 21/265* (2013.01); *G01C 21/3608* (2013.01); *G06F 3/04817* (2013.01); *G06F 3/04842* (2013.01); *G08G 1/0967* (2013.01); *G10L 15/22* (2013.01); *G10L 2015/223* (2013.01)

(58) Field of Classification Search
CPC ......... G06F 3/167; G06F 17/30; G10L 15/22; G10L 21/00; G10L 15/04; G01C 21/265; G01C 21/00
USPC ......... 704/246, 275, 251; 345/443, 592, 589
See application file for complete search history.

(56) References Cited

U.S. PATENT DOCUMENTS

2007/0101290 A1* 5/2007 Nakashima .......... G01C 21/265
715/797
2007/0162281 A1* 7/2007 Saitoh .................. G10L 15/197
704/251
(Continued)

FOREIGN PATENT DOCUMENTS

JP 2006-171305 A 6/2006
JP 2007-286358 A 11/2007
(Continued)

*Primary Examiner* — Pierre-Louis Desir
*Assistant Examiner* — Seong Ah A Shin
(74) *Attorney, Agent, or Firm* — Birch, Stewart, Kolasch & Birch, LLP

(57) ABSTRACT

Because a voice recognition device in accordance with the present invention can adjust the output of a voice recognition result according to the priority of a display of the recognition result with respect to display information other than the voice recognition result at all times while recognizing an uttered voice, the voice recognition device prevents the acquisition of other information important for the user from being blocked due to the display of the recognition result, and improves the user's convenience.

19 Claims, 16 Drawing Sheets

(51) Int. Cl.
*G06F 3/0481* (2013.01)
*G06F 3/0484* (2013.01)
*G01C 21/26* (2006.01)
*G08G 1/0967* (2006.01)
*G01C 21/36* (2006.01)
*G10L 15/22* (2006.01)

(56) References Cited

U.S. PATENT DOCUMENTS

| | | | |
|---|---|---|---|
| 2007/0244629 A1 | 10/2007 | Hirayama | |
| 2008/0154611 A1* | 6/2008 | Evermann | G06F 17/30899 704/275 |
| 2010/0198093 A1* | 8/2010 | Katayama | G10L 15/22 600/519 |
| 2010/0229116 A1* | 9/2010 | Murase | G01C 21/3608 715/810 |
| 2011/0095905 A1* | 4/2011 | Mase | G01C 21/32 340/901 |
| 2011/0231191 A1 | 9/2011 | Miyazaki | |
| 2012/0173245 A1* | 7/2012 | Miyahara | G01C 21/3617 704/275 |
| 2013/0141429 A1* | 6/2013 | Sakakibara | G06T 15/00 345/419 |
| 2014/0089314 A1* | 3/2014 | Iizuka | G06F 3/167 707/740 |
| 2014/0156181 A1* | 6/2014 | Watanabe | G01C 21/3632 701/427 |
| 2016/0152184 A1* | 6/2016 | Ogawa | G02B 27/0101 345/589 |

FOREIGN PATENT DOCUMENTS

| | | |
|---|---|---|
| JP | 2007-303878 A | 11/2007 |
| JP | 2008-14818 A | 1/2008 |
| JP | 2008-180786 A | 8/2008 |
| JP | 2008-232900 A | 10/2008 |
| JP | 2010-204637 A | 9/2010 |
| JP | 4973722 B2 | 7/2012 |
| WO | WO 2010/061751 A1 | 6/2010 |

* cited by examiner

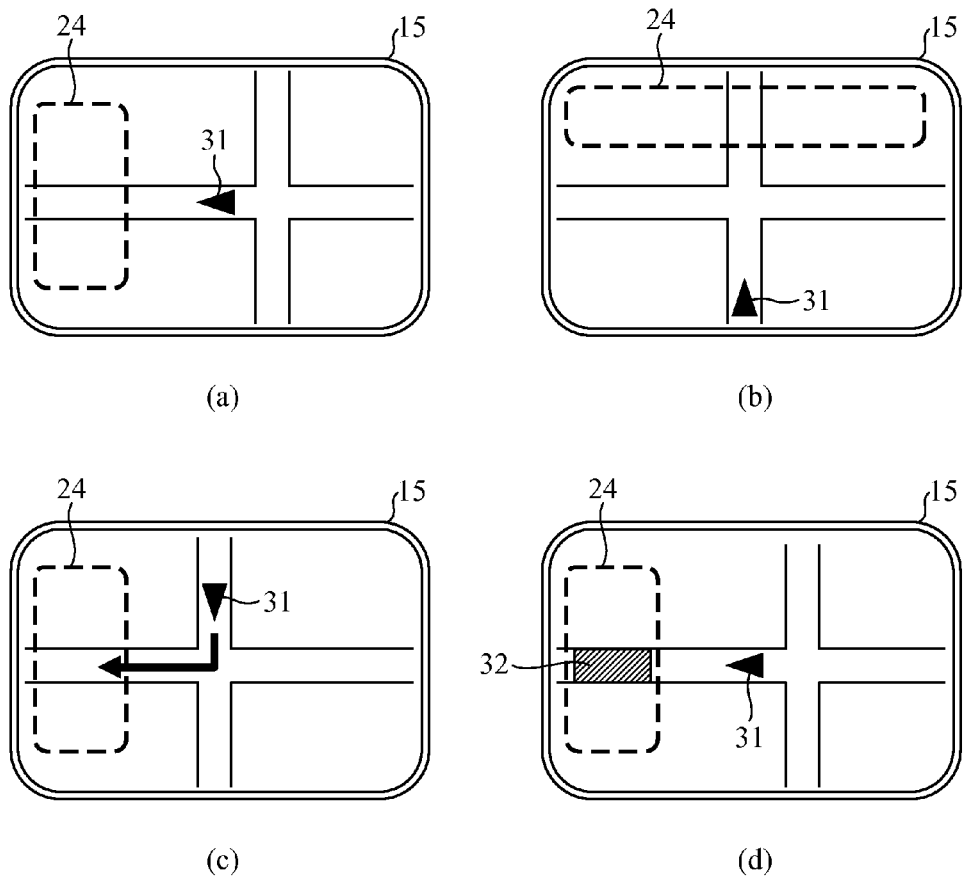

| Number of Facility Icons | Priority Adjustment Amount |
|---|---|
| 0 | 0 |
| 1 | -2 |
| 2 | -4 |
| 3 | -6 |
| ⋮ | ⋮ |

| Item (4) Type of Road along Which Vehicle Is Traveling | Priority Adjustment Amount |
|---|---|
| Traveling along Highway | +10 |
| Travelling along Local Road | -10 |
| Traveling through Tunnel | +10 |

| Item (5) Type of Area in Which Vehicle Is Traveling | Priority Adjustment Amount |
|---|---|
| Traveling in Urban Area | -10 |
| Travelling in Suburban Area | -5 |
| Traveling in Mountains | +10 |
| Traveling on Sea | +10 |

| Item (6) Graphical Scale of Map | Priority Adjustment Amount |
|---|---|
| 25m | -20 |
| 50m | -18 |
| 100m | -16 |
| ⋮ | ⋮ |
| 500m | 0 |
| 1km | +6 |
| 3km | +8 |
| 5km | +10 |

| Item (7) Guidance Information/Warning Information | Priority Adjustment Amount |
|---|---|
| Displaying Intersection Guidance Information | -40 |
| Displaying Pedestrian Information | -50 |
| Displaying Oncoming Vehicle Information | -50 |
| Displaying Disaster Information | -50 |

FIG.13

| Item (8) | | Priority Adjustment Amount |
|---|---|---|
| Recognition Result | Display Screen | |
| Word about Music | Playback Screen of Music | +10 |
| Word about Music | Map Screen | -10 |
| Word about Facility | Playback Screen of Music | -10 |
| Word about Facility | Map Screen | +10 |

| Display Priority | Recognition Dictionary Name |
|---|---|
| 0 - 20 | Adic |
| 21 - 40 | Bdic |
| 41 - 60 | Cdic |
| 61 - 80 | Ddic |
| 81 - 100 | Edic |

(a)

| Recognition Dictionary | Number of Recognized Words |
|---|---|
| Adic | 5 |
| Bdic | 10 |
| Cdic | 15 |
| Ddic | 20 |
| Edic | 25 |

(b)

| Reading of Word | Recognition Rank |
|---|---|
| Convenience Store | 1 |
| Gas Station | 2 |
| Restaurant | 3 |
| Parking Lot | 4 |
| Station | 5 |
| ⋮ | ⋮ |

VOICE RECOGNITION DEVICE AND DISPLAY METHOD

FIELD OF THE INVENTION

The present invention relates to a voice recognition device that recognizes a voice uttered by a user and displays a result of the recognition, and a display method of displaying the recognition result on a display device.

BACKGROUND OF THE INVENTION

As a voice recognition method, a method of recognizing a voice uttered by a user and displaying a result of the recognition is known.

For example, patent reference 1 discloses a voice recognition device that recognizes a voice uttered by a user and displays a result of the recognition, and that, on the basis of the usage state of equipment which can be operated by the user, the user's living body information, etc., estimates the load on the user, and, when the load is large (i.e., when the frequency with which the user visually recognizes a display provided by a display means is low), makes it easy for the recognition result to be displayed, whereas when the load is small (i.e., when the frequency with which the user visually recognizes the display provided by the display means is high), makes it difficult for the recognition result to be displayed.

RELATED ART DOCUMENT

Patent Reference

Patent reference 1: Japanese Unexamined Patent Application Publication No. 2010-204637

SUMMARY OF THE INVENTION

Problems to be Solved by the Invention

A problem with conventional voice recognition devices, such a one as described in, for example, patent reference 1 is, however, that because the output frequency of the recognition result cannot be adjusted on the basis of anything other than the load on the user, the voice recognition result is displayed even though information important for the user on the map is displayed, and therefore the user is blocked from acquiring the important information.

The present invention is made in order to solve the above-mentioned problem, and it is therefore an object of the present invention to provide a voice recognition device that, according to the display priority of a voice recognition result with respect to display information other than recognition results, can adjust an output of the voice recognition result, and a display method of displaying the recognition result on a display device.

Means for Solving the Problem

In order to achieve the above-mentioned object, in accordance with the present invention, there is provided a voice recognition device that recognizes a voice uttered by a user and displays an operation button to which a function corresponding to a recognition result is assigned, the voice recognition device including: a voice acquirer to detect and acquire a voice uttered by the user; a voice recognizer to refer to a voice recognition dictionary, recognize voice data acquired by the voice acquirer, and output a recognition result; a display to display an operation button to which a function corresponding to the recognition result outputted by the voice recognizer is assigned; a display controller to output a command for displaying the operation button to which the function corresponding to the recognition result outputted by the voice recognizer is assigned in a recognition result display area of the display; a display priority calculator to calculate a display priority serving as a degree that information other than said operation button is displayed with a higher priority than said operation button in the recognition result display area; and a recognition result output controller to decrease a display frequency of the operation button with increase in the display priority calculated by the display priority calculator by decreasing an output frequency of the recognition result.

Advantages of the Invention

Because the voice recognition device in accordance with the present invention can adjust the display frequency of the operation button according to the display priority of information other than the operation button with respect to the operation button to which the function corresponding to the voice recognition result is assigned, the voice recognition device prevents the acquisition of other information important for the user from being blocked due to the display of the operation button, and improves the user's convenience.

BRIEF DESCRIPTION OF THE FIGURES

FIG. 4 is a diagram showing a relation among a map screen, the traveling direction of a vehicle, and the recognition result display area;

FIG. 5 is a table showing an example of a correspondence between information in the traveling direction of the vehicle, and a display priority adjustment amount of a recognition result;

FIG. 12 is a table showing an example of a correspondence between guidance information/warning information and a display priority adjustment amount of a recognition result;

FIG. 13 is a table showing an example of the display priority adjustment amount of a recognition result for a combination of the contents of the recognition result and a display screen currently being displayed;

EMBODIMENTS OF THE INVENTION

Hereafter, the preferred embodiments of the present invention will be explained in detail with reference to the drawings.

In accordance with the present invention, there is provided a voice recognition device that recognizes a voice uttered by a user, and, at all times while the voice recognition device is active, recognizes a voice. Although a case of applying the voice recognition device in accordance with the present invention to a navigation device mounted in a moving object, such as a vehicle, will be explained, as an example, in the following embodiments, the voice recognition device can also be applied to a navigation device for other moving objects other than vehicles, and a server for navigation system. Further, the voice recognition device in accordance with the present invention can be applied to an application for navigation system installed in mobile information terminals, such as smart phones, tablet PCs, and mobile phones.

Embodiment 1.

Figure 1:
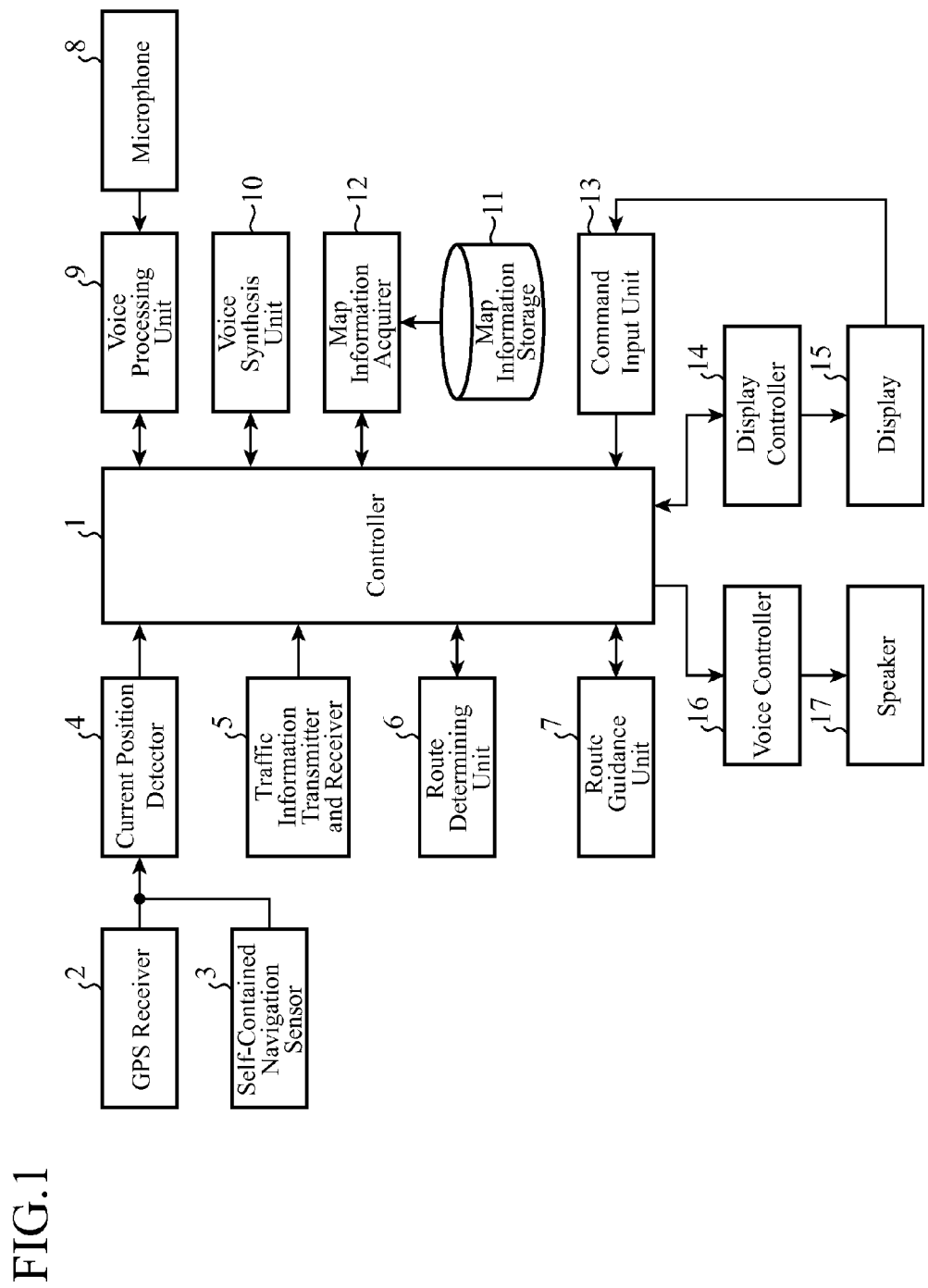
FIG. 1 is a block diagram showing an example of a navigation device to which a voice recognition device in accordance with Embodiment 1 is applied.

FIG. 1 is a block diagram showing an example of a navigation device to which a voice recognition device in accordance with Embodiment 1 of the present invention is applied. This navigation device includes a controller 1, a GPS receiver 2, a self-contained navigation sensor 3, a current position detector 4, a traffic information transmitter and receiver 5, a route determining unit 6, a route guidance unit 7, a microphone 8, a voice processing unit 9, a voice synthesis unit 10, a map information storage 11, a map information acquirer 12, a command input unit 13, a display controller 14, a display 15, a voice controller 16, and a speaker 17.

The controller 1 controls the operation of the entire navigation device.

The GPS receiver 2 is intended to apply a satellite navigation system that measures the current position of a moving object by using radio waves from GPS satellites.

The self-contained navigation sensor 3 is intended to detect the current position and heading of a moving object by using a heading sensor, a travel distance sensor, and so on, and apply a self-contained navigation system.

The current position detector 4 receives signals of the GPS receiver 2 and the self-contained navigation sensor 3, and detects the current position and traveling direction of a vehicle by using the satellite navigation system and the self-contained navigation system together, and performing map matching on the basis of below-mentioned map information. The current position detector can alternatively use one of the navigation systems.

The traffic information transmitter and receiver 5 receives traffic information provided by an FM multiplex broadcast, a radio wave beacon, or a light beacon (which is represented by VICS (Vehicle Information & Communication System/registered trademark)), congestion information provided by DSRC (Dedicate Short Range Communication), and so on. The traffic information transmitter and receiver also transmits information about the vehicle, e.g., probe information such as the current position.

On the basis of a point which is set by a user through the command input unit 13 which will be mentioned later or a voice operation, the position information detected by the current position detector 4, and map information acquired by the map information acquirer 12 which will be mentioned later, the route determining unit 6 determines an optimal route (referred to as "a recommended route" from here on) from the current position to the set point.

The route guidance unit 7 generates a route guidance diagram and a route guidance message for providing guidance at a time when the vehicle travels along the route determined by the route determining unit 6 on the basis of the map information acquired by the map information acquirer 12.

The microphone 8 acquires (sound-collects) a voice uttered by the user. As the microphone 8, for example, there is provided an omnidirectional (or nondirectional) microphone, an array microphone in which a plurality of omnidirectional (or nondirectional) microphones are arranged in an array form, and its directional characteristics are made to be adjustable, or a unidirectional microphone which has directivity only in a single direction and whose directional characteristics cannot be adjusted.

The voice processing unit 9 processes the voice acquired by the microphone 8, and performs voice recognition. The details of the voice recognition will be mentioned later with reference to FIG. 2.

The voice synthesis unit 10 generates a synthesized voice from inputted characters or an inputted character string. Voice synthesis is performed by using a method disclosed in, for example, "Sadaoki Furui, "Speech Information Processing" Chapter 4."

The map information storage 11 stores, for example, data such as "road information" about roads, "facility information" about facilities (types, names, positions, etc.), "various pieces of character information" (place names, facility names, intersection names, road names, etc.), "various pieces of icon information" each showing a facility, a road number, or the like, and pieces of information for guidance which are used in the route guidance unit (position information about predetermined key points, drawing information at each of the key points, further, voice guidance information, etc.). The map information storage can be, for example, an HDD (Hard Disk Drive) or a memory, such as an SD card, using a semiconductor device. As an alternative, the map information storage can exist on a network and be configured (map data acquirer) to be able to acquire information, such as road data, via a communication network.

When receiving a map information acquisition command, a facility information acquisition command, or the like, the map information acquirer 12 searches through the map information storage 11 to acquire necessary information.

The command input unit 13 inputs a command through a user's manual operation. This command is provided by a hardware switch disposed in the navigation device, a touch switch set and displayed on the display which will be mentioned later, a recognition device that recognizes a command issued by either a remote controller installed in a steering wheel or the like or a remote controller separately disposed, or the like.

The display controller 14 acquires necessary information from the map information acquirer 12, the current position detector 4, the traffic information transmitter and receiver 5, the route determining unit 6, the route guidance unit 7, and the voice processing unit 9, generates information which is to be drawn on the display 15 which will be mentioned later, and outputs a command for displaying this information to the display 15.

The display 15 is a display-integrated touch panel. For example, the display is comprised of an LCD (Liquid Crystal Display) and a touch sensor, and performs drawing on the screen according to the command from the display controller 14. As the touch panel, any of a one of pressure sensitive type, a one of electromagnetic induction type, a one of capacitive sensing type, or a one which is a combination of some of these types can be used. Further, instead of the LCD, an organic electroluminescence display can be used.

The voice controller 16 outputs a command for outputting both the voice information for guidance from the route guidance unit 7 and the synthesized voice generated by the voice synthesis unit 10 to the speaker 17.

The speaker 17 outputs the voice according to the command from the voice controller 16.

Figure 2:
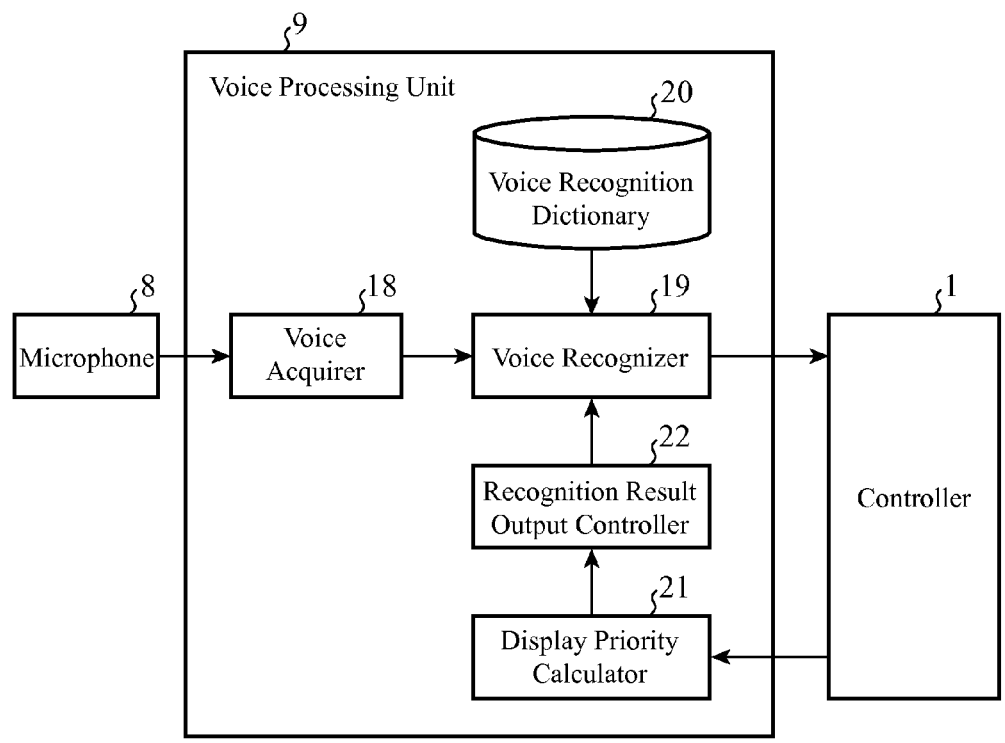
FIG. 2 is a block diagram showing an example of the structure of a voice processing unit in accordance with Embodiment 1.

Next, the details of the voice processing unit 9 will be explained. FIG. 2 is a block diagram showing an example of the structure of the voice processing unit 9 in accordance with Embodiment 1. As shown in FIG. 2, the voice processing unit 9 is comprised of a voice acquirer 18, a voice recognizer 19, a voice recognition dictionary 20, a display priority calculator 21, and a recognition result output controller 22.

The voice acquirer 18 captures a user's utterance acquired by the microphone 8, i.e., an inputted voice, and A/D (Analog/Digital) converts the inputted voice by using, for example, PCM (Pulse Code Modulation).

The voice recognizer 19 detects a voice section corresponding to the contents which the user has uttered from a voice signal digitized by the voice acquirer 18, extracts a feature quantity of the voice data about this voice section, performs a recognition process on the basis of the feature quantity by using the voice recognition dictionary 20, and outputs a recognition result having a likelihood equal to or greater than a predetermined likelihood of judgments (or greater than the predetermined likelihood of judgments). The recognition process can be performed by using, for example, a typical method such as an HMM (Hidden Markov Model) method.

By the way, in a voice recognition function mounted in car navigation systems and so on, it is general that the user specifies (commands) a start of his or her utterance for the system. Therefore, a button for commanding a voice recognition start (referred to as "a voice recognition start commander" from here on) is displayed on the touch panel or installed in the steering wheel. The voice recognizer then recognizes a voice uttered after the voice recognition start commander is pressed by the user. More specifically, the voice recognition start commander outputs a voice recognition start signal, and, when receiving this signal, the voice recognizer detects a voice section corresponding to the contents which the user has uttered from the voice data acquired by the voice acquirer after receiving the signal, and performs the above-mentioned recognition process.

In contrast, the voice recognizer 19 in accordance with this Embodiment 1 recognizes the contents which the user has uttered at all times, even if the voice processing unit does not provide a voice recognition start command, as mentioned above, which is provided by the user. More specifically, even if the voice processing unit does not receive a voice recognition start signal, the voice recognizer 19 repeatedly performs the process of, at all times while the navigation device in which this voice recognition device is incorporated is active, detecting a voice section corresponding to the contents which the user has uttered from the voice data acquired by the voice acquirer 18, extracting a feature quantity of the voice data about this voice section, performing the recognition process on the basis of the feature quantity by using the voice recognition dictionary 20, and outputting a voice recognition result. The same goes for the following embodiments.

As the predetermined likelihood of judgments which the voice recognizer 19 uses when outputting a recognition result, a fixed initial value (e.g., 500) is set in advance, and, after that, a value determined by the recognition result output controller 22 which will be mentioned later is set.

Figure 3:
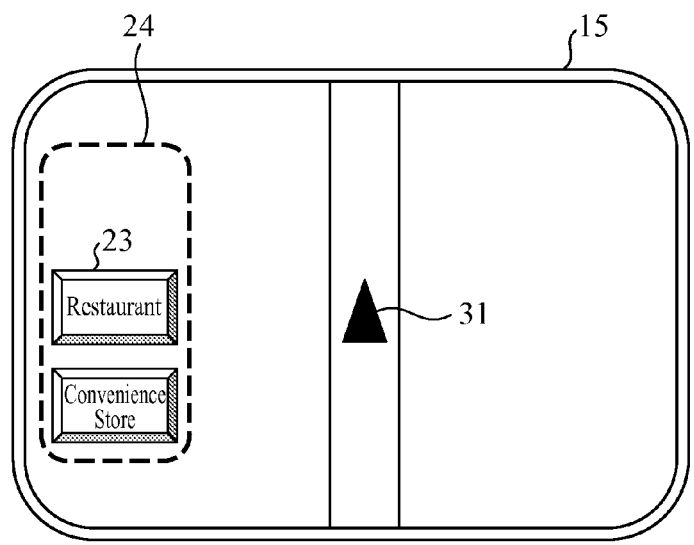
FIG. 3 is a diagram showing an example of a screen on which operation buttons which are a recognition result are displayed in a recognition result display area in a left portion of a display in a state in which a map screen is displayed on the display.

The display controller 14 outputs a command for displaying the recognition result provided by the voice recognizer 19 in a recognition result display area 24 (refer to FIG. 3) which is set in advance as an area in which the recognition result is displayed to the display 15. FIG. 3 is a diagram showing an example of the screen on which operation buttons 23 which are the recognition result are displayed in the recognition result display area 24 which is a left portion in the display 15 in a state in which a map screen is displayed on the display 15 as well as a vehicle 31. The recognition result display area 24 can be a left portion in the display 15, as shown in, for example, FIG. 3, or can be an area fixed and set in advance, such as an upper portion in the display 15, as shown in FIG. 4(b) which will be mentioned later. As an alternative, the user is enabled to arbitrarily set up the area.

Further, in accordance with this embodiment, the recognition result provided by the voice recognizer 19 is displayed, as the operation buttons 23, in the recognition result display area 24 of the display 15, as shown in, for example, FIG. 3. Functions corresponding to the recognition result are assigned to the displayed recognition result (operation buttons 23), and, when one of the operation buttons 23 is selected by an operation via the command input unit 13 or a voice operation, the function assigned to the operation button is performed.

On the other hand, when no selection operation on the operation buttons 23 is performed by the user during a fixed time period (e.g., 5 to 10 seconds) after the operation buttons 23 have been displayed in the recognition result display area 24, the display controller 14 outputs a command for ending the display of the recognition result (the display of the operation buttons 23) to the display 15. As a result, the display of the operation buttons 23 which are the recognition result disappears.

In the following explanation, the voice recognizer 19 recognizes a genre name (referred to as "a facility genre name" from here on), such as "gas station" or "convenience store", to which a facility belongs from the user's utterance, and outputs the recognition result on the basis of the likelihood of judgments set by the recognition result output controller 22.

The display controller 14 is assumed to output a command for displaying the outputted recognition result as operation buttons 23 as shown in FIG. 3. A function of performing a facility search by a corresponding genre is assigned to each of the operation buttons 23, and, when one of the operation buttons 23 is selected by the user, a command signal which is brought into correspondence with the operation button 23, and which shows a command for performing a facility search by the genre is outputted, and the map information acquirer 12 acquires facility information from the map information storage 11 on the basis of the signal.

Further, an explanation will be made by assuming that the voice recognizer 19 performs recognition on the facility genre name by using keyword spotting which is a well-known technique.

Instead of the recognition on the facility genre name by using the keyword spotting, all of the recognition can be performed by using large vocabulary continuous voice recognition, and a method of performing a morphological analysis on the recognition result and extracting a facility genre name can be used.

It is further assumed that the voice recognizer 19 recognizes, instead of a facility genre name, for example, an artist name, an album name, a music title name, a command for operating the car navigation system, or the like. Further, a function assigned to the displayed recognition result (operation button 23) can be a one of searching for a piece of music by using, for example, an artist name, an album name, or a music title name, or a one corresponding to a command.

The display priority calculator 21 determines which of predetermined items (1) to (8), which will be mentioned later, is satisfied on the basis of the current position information detected by the current position detector 4, the traffic information received by the traffic information transmitter and receiver 5, the route information determined by the route determining unit 6, the guidance information outputted by the route guidance unit 7, the information acquired by the map information acquirer 12, and so on, determines a display priority adjustment amount for each of all satisfying items on the basis of results of the determination, and calculates a display priority of the recognition result in the recognition result display area 24.

The display priority shows the degree that the voice recognition result should be displayed with a higher priority than display information (e.g., map information and so on) other than the voice recognition result. The higher the display priority is, the lower the likelihood of judgments of the voice recognition becomes. Accordingly, the voice recognition is easily performed, and the output frequency (display frequency) of the voice recognition result becomes high as a result. In contrast, the lower the display priority is, the higher the likelihood of judgments of the voice recognition becomes. Accordingly, the voice recognition is difficultly performed, and the output frequency (display frequency) of the voice recognition result becomes low as a result. More specifically, the display priority and the likelihood of judgments which is used for voice recognition have a negative correlation between them.

Next, while items determined by the display priority calculator 21 and the display priority adjustment amount (adjustment value) for each item will be explained, a method of calculating the display priority will be explained.

It is assumed that each item is categorized into one of the following major items as shown in (1) to (8), and the display priority calculator 21 determines at least one of the major items (1) to (8) as a determination object. One or more items can be predetermined as the one or more major items which are determination objects, or the user is enabled to arbitrarily select one or more items from a setting screen.

(1) "The Presence or Absence of the Recognition Result Display Area 24 in the Traveling Direction of the Vehicle"

FIG. 4 is a diagram showing a relation among the map screen, the traveling direction of the vehicle, and the recognition result display area 24.

When a map is displayed on the display 15 while being oriented north-up, the traveling direction means "the bearing in which the vehicle is actually traveling." For example, when the map is oriented north-up and the vehicle 31 is traveling westward, a display as shown in FIG. 4(a) is produced. Further, FIG. 4(a) shows a case in which the recognition result display area 24 is a left portion in the display 15.

Further, when a map is displayed on the display 15 while being oriented heading-up, the traveling direction means "an upward direction on the display screen." In this case, for example, a display as shown in FIG. 4(b) is produced. This FIG. 4(b) shows a case in which the recognition result display area 24 is an upper portion in the display 15.

In addition to the above-mentioned examples, for example, there is a case, as shown in FIG. 4(c), in which when the recognition result display area 24 exists in a direction toward which the vehicle 31 makes a right (or left) turn, "the actual bearing after the right (or left) turn" or "a direction on the display screen after the right (or left) turn" is the traveling direction.

Next, a determination method which the display priority calculator 21 uses will be explained.

The following explanation will be made by assuming that information about the position and range in the display 15 of the recognition result display area 24 is stored in the display priority calculator 21. As an alternative, the information can be stored in another component like, for example, the display controller 14, and can be acquired from the component.

When a map is displayed while being oriented north-up, for example, the display priority calculator 21 acquires the current traveling direction of the vehicle from the current position detector 4, and determines whether the traveling direction matches the position of the recognition result display area 24.

Further, when a map is displayed while being oriented heading-up, for example, the display priority calculator 21 determines whether or not the position of the recognition result display area 24 is in an upper portion of the display screen.

When the recognition result display area 24 exists in the traveling direction of the vehicle, the display priority calculator can further determine whether or not traffic information is displayed on the road in the traveling direction.

For example, the display priority calculator determines whether a display 32 of congestion information is produced on the road in the traveling direction, as shown in FIG. 4(*d*). The traffic information can be either traffic information showing that the road is congested or under construction, or an accident has occurred, or other traffic information. In this case, the display priority calculator 21 should just acquire the traffic information from the traffic information transmitter and receiver 5.

Next, the display priority adjustment amount will be explained.

FIG. 5 is a table showing an example of a correspondence between information in the traveling direction of the vehicle, and a display priority adjustment amount of the recognition result.

In this case, the information in the traveling direction of the vehicle is assumed to be important for the user, and an adjustment amount for lowering the display priority is set. Further, when a display of the traffic information is produced on the road in the traveling direction of the vehicle, information important for the user is assumed to be further provided, and an adjustment amount for further lowering the display priority is set.

Although an initial value of the display priority is set to 50 and the display priority is set to have a value ranging from 0 to 100 in this Embodiment 1, the display priority is not limited to any one of these values.

Further, the initial value of the display priority and the display priority adjustment amount for each item which will be mentioned later can be changed according to a case of calculating the display priority in consideration of the range which the display priority can have and a plurality of other major items which will be mentioned later, and so on.

In addition, it is assumed in this Embodiment 1 that when the result of the calculation of the display priority exceeds (falls below) an upper limit (lower limit), the display priority is set to 100 (0).

Hereafter, the method of calculating the display priority will be explained by using a concrete numerical value while a case in which the determination objects include only this item (1) is taken as an example.

For example, when a map is displayed while being oriented north-up, the traveling direction of the vehicle 31 is a westward direction, and the recognition result display area 24 is set to be a left portion in the display 15, as shown in FIG. 4(*d*), the display priority calculator 21 refers to the table of FIG. 5 and determines a display priority adjustment amount to be −30 because the recognition result display area 24 exists in the traveling direction of the vehicle 31.

Further, in the case of this FIG. 4(*d*), because congestion information is further displayed in the traveling direction of the vehicle 31, the display priority calculator 21 further determines a display priority adjustment amount to be −10 from the table of FIG. 5.

As a result, the display priority calculator 21 calculates the display priority=the initial value of 50+the adjustment amount (−30)+the adjustment amount (−10)=10. A method of determining a likelihood of judgments corresponding to the display priority calculated in this way will be mentioned later.

(2) "The Presence or Absence of Facility Icons Currently being Displayed in the Recognition Result Display Area 24 and the Number of Facility Icons"

Figures 6, 7, 8:
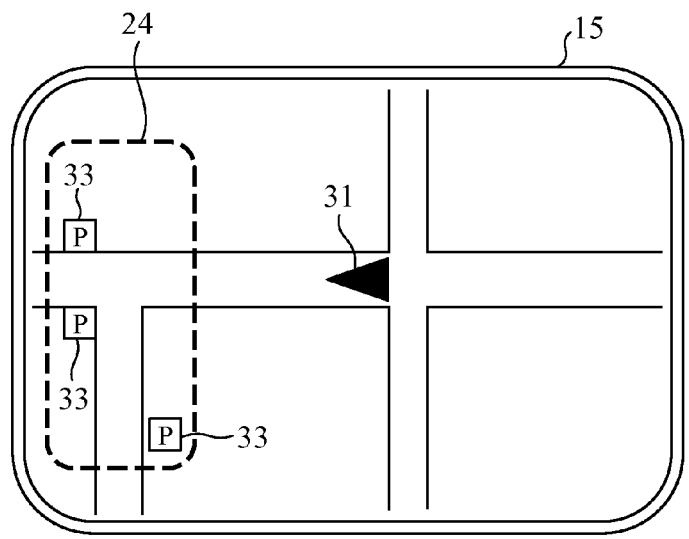
FIG. 6 is a diagram showing an example of a screen on which facility icons, such as parking lots, are displayed in the recognition result display area in a state in which a map screen is displayed on the display.
FIG. 7 is a table showing a correspondence between the number of facility icons and a display priority adjustment amount.
FIG. 8 is a table showing an example of the display priority adjustment amount of a recognition result for each road type.

FIG. 6 is a diagram showing an example of the screen on which facility icons 33, such as parking lots, are displayed in the recognition result display area 24 in a state in which a map screen is displayed on the display 15.

For this item (2), the display priority calculator 21 determines whether or not facility icons 33, such as parking lots, are displayed in the recognition result display area 24. The display priority calculator 21 can determine not only the presence or absence of facility icons 33 currently being displayed in the recognition result display area 24, but also the number of facility icons 33.

For example, the display priority calculator 21 acquires the map information generated by the display controller 14, and determines the presence or absence of information about facility icons 33 and the number of facility icons with respect to a range corresponding to the recognition result display area 24.

In this case, because a point shown by each facility icon 33 is an important point where there is a high possibility that the user will make a stop, when the facility icon 33 exists within the recognition result display area 24, an adjustment amount for lowering the display priority of the voice recognition result is set.

For example, when facility icons 33 exist in the recognition result display area 24, a display priority adjustment amount is set to −10 so as to lower the display priority. Further, as shown in FIG. 7, an adjustment amount for further lowering the display priority with increase in the number of facility icons 33 can be set.

FIG. 7 is a table showing a correspondence between the number of facility icons 33 and a display priority adjustment amount. For example, when three facility icon 33 exist in the recognition result display area 24, as shown in FIG. 6, −6 is determined as the display priority adjustment amount corresponding to the number of facility icons with reference to FIG. 7.

More specifically, when three facility icons 33 exist in the recognition result display area 24, as shown in FIG. 6, the display priority adjustment amount which is associated with this item (2) is determined as follows. "−10" is determined because facility icons 33 exist in the recognition result display area 24 and "−6" is determined because the number of facility icons is three, and the sum "−16" of these values is determined as the adjustment amount.

(3) "The Presence or Absence of Points Currently being Displayed in the Recognition Result Display Area 24 and Set by the User, and the Number of Points"

For example, the display priority calculator 21 acquires the map information generated by the display controller 14, and determines the presence or absence of information about a destination, waypoints, registration places, etc. which are set by the user (referred to as "set point icons" from here on) and the number of set point icons with respect to the range corresponding to the recognition result display area 24.

In this case, because each point set by the user is a point important for the user, when set point icons exist within the recognition result display area 24, an adjustment amount for lowering the display priority is set.

For example, when set point icons exist in the recognition result display area 24, a display priority adjustment amount is set to be −5 so as to lower the display priority. Further, an adjustment amount for further lowering the display priority with increase in the number of set point icons can be set, like in the case of above-mentioned (2).

(4) "The Type of the Road Along which the Vehicle is Traveling"

For example, the display priority calculator 21 acquires the vehicle position information detected by the current position detector 4, and acquires and determines the road type of the road along which the vehicle is traveling, the road type being acquired by the map information acquirer 12 from the map information storage 11 by using the vehicle position information.

In this case, as the road type, for example, "highway", "local road", "tunnel", or the like is provided.

FIG. 8 is a table showing an example of the display priority adjustment amount of the recognition result for each road type.

In this case, because it can be assumed that information about the surroundings other than parking areas, service areas, and entrances does not have a high degree of importance for the user when the vehicle is traveling along a highway, an adjustment amount for raising the display priority of the recognition result is set. Further, because it can be assumed that information about the surroundings has a high degree of importance for the user when the vehicle is traveling along a local road, an adjustment amount for lowering the display priority is set. Further, because it can be assumed that there is no information about the surroundings which is important for the user when the vehicle is traveling through a tunnel, an adjustment amount for raising the display priority of the recognition result is set.

(5) "The Area in which the Vehicle is Traveling"

For example, the display priority calculator 21 acquires the vehicle position information detected by the current position detector 4, and acquires and determines the area type of the area in which the vehicle is traveling, the area type being acquired by the map information acquirer 12 from the map information storage 11 by using the vehicle position information.

In this case, as the area type, for example, "urban area", "suburban area", "in mountains", "on the sea", or the like is provided.

Figures 9, 10, 11:
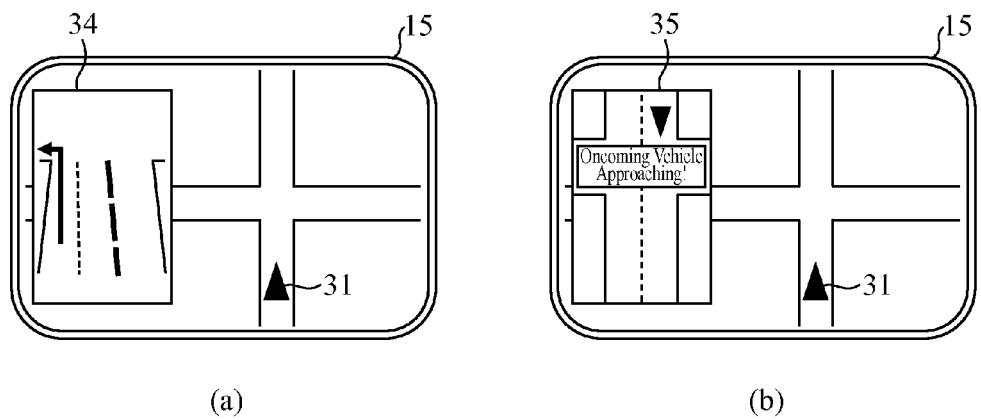
FIG. 9 is a table showing an example of the display priority adjustment amount of a recognition result for each area type.
FIG. 10 is a table showing an example of the display priority adjustment amount of a recognition result for each map graphical scale.
FIG. 11 is a diagram showing an example of a screen on which guidance information or warning information is displayed in the recognition result display area in a state in which a map screen is displayed on the display.

FIG. 9 is a table showing an example of the display priority adjustment amount of the recognition result for each area type.

In this case, because a large amount of information is displayed on a map when the vehicle is traveling in an urban area, an adjustment amount for lowering the display priority of the voice recognition result is set. Further, although an adjustment amount for lowering the display priority is set when the vehicle is traveling in a suburban area, the adjustment amount is set in such a way that the amount of lowering in the display priority is small compared with that at the time when the vehicle is traveling in an urban area because the amount of information displayed on the map is small compared with that at the time when the vehicle is traveling in an urban area. In addition, because the amount of information displayed on the map is small when the vehicle is traveling in mountains or on the sea (e.g., when the vehicle is traveling across the Akashi Kaikyo Bridge), an adjustment amount for raising the display priority is set. In addition, when the vehicle is traveling along a coastal road, and the recognition result display area 24 is on the sea, an adjustment amount for raising the display priority can be set.

(6) "The Graphical Scale of the Map"

For example, the display priority calculator 21 acquires and determines the current graphical scale of the map from the display controller 14, or a setting storage (not shown) or the like that stores various settings made by the user.

In this case, as the graphical scale, "25 m", "50 m", "100 m", . . . , "500 m", "1 km", "3 km", "5 km", or the like which is the distance corresponding to the scale which serves as a reference is set.

FIG. 10 is a table showing an example of the display priority adjustment amount of the recognition result for each graphical scale of the map.

In this case, because as the graphical scale is reduced (the map is enlarged), the degree of importance of the map information currently being displayed becomes higher, an adjustment amount which also lowers the display priority of the voice recognition result with reduction in the graphical scale is set.

For example, the display priority adjustment value for the largest graphical scale is set to "+10", and the display priority adjustment amount is reduced with reduction in the graphical scale.

(7) "Whether or not Guidance Information/Warning Information is Displayed in the Recognition Result Display Area 24"

FIG. 11 is a diagram showing an example of the screen on which guidance information 34 or warning information 35 is displayed in the recognition result display area 24 in a state in which a map screen is displayed on the display 15.

The display priority calculator 21 determines whether or not a display of guidance information or warning information, such as a display of intersection guidance, as shown in FIG. 11(*a*), a display of a warning about approach of an oncoming vehicle acquired by DSRC, as shown in FIG. 11(*b*), a display of a warning about approach of a pedestrian, or a display of disaster information, is produced.

For example, the display priority calculator 21 acquires the map information generated by the display controller 14, and determines whether or not an output of guidance information or warning information, such as a display of intersection guidance or a display of a warning, is produced with respect to the range corresponding to the recognition result display area 24.

Further, when the display position of guidance information/warning information is determined to be the same position as the recognition result display area 24, the display priority calculator 21 should just acquire the current position from the current position detector 4, check to see whether guidance information associated with the position exists in the map information storage 11 via the map information acquirer 12 by using the position information, and, as to warning information, inquire of the traffic information transmitter and receiver 5 about the presence or absence of warning information.

FIG. 12 is a table showing an example of a correspondence between guidance information/warning information, and a display priority adjustment amount of the recognition result.

Because it is assumed that guidance information/warning information has a high degree of importance for the user compared with other information, a priority adjustment amount which makes the amount of lowering in the display priority become larger than that for an item belonging to another major item is set.

(8) "A Relation Between the Contents of the Recognition Result and the Display Screen"

Hereafter, an explanation will be made by assuming that the target for voice recognition is, for example, words associated a piece of music, such as an artist name, an album name, or a music title name. In this case, when voice recognition is performed on those words, an operation button showing an artist name, an operation button showing an album name, an operation button showing a music title, or the like is displayed as the recognition result, and, when the user presses the button, a piece of music will be played back.

At this time, when the display screen currently being displayed on the display 15 is an AV screen (screen for playback of a piece of music), because it can be assumed that the user is in a state in which the user is listening to music, and, even if an operation button associated with playback of the piece of music is displayed as the voice recognition result, this display could not interfere with the user and the user is rather in a state which the user desires the piece of music to be played back by operating the operation button, a priority adjustment amount which raises the display priority of the recognition result is set.

In contrast, when the display screen currently being displayed on the display 15 is a normal map screen, because it can be assumed that the user is in a state in which the user wants to look at map information about route guidance, and, when an operation button associated with playback of a piece of music is displayed as the voice recognition result, this display could interfere with the user's driving, a priority adjustment amount which lowers the display priority of the recognition result is set.

FIG. 13 is a table showing an example of the display priority adjustment amount of the recognition result for each combination of the contents of the recognition result and the display screen currently being displayed.

Thus, according to the relation between the contents of the voice recognition result and the display screen actually being displayed on the display 15, a priority adjustment amount which raises the display priority to make it easier for the recognition result to be displayed when the recognition result is information important for the user at that time, whereas lowers the display priority to make it more difficult for the recognition result to be displayed when it is assumed that the user is in a state in which the recognition result is not important at that time.

As mentioned above, as to each of the above-mentioned major items (1) to (8), the display priority calculator 21 determines a display priority adjustment amount for each item which is a predetermined determination object, and calculates a display priority.

The recognition result output controller 22 determines a likelihood of judgments corresponding to the display priority calculated by the display priority calculator 21, and sets the likelihood of judgments to the voice recognizer 19.

Then, when the likelihood of the recognition result is equal to or greater than this set likelihood of judgments (or greater than the likelihood of judgments), the voice recognizer 19 outputs the recognition result.

Figure 14:
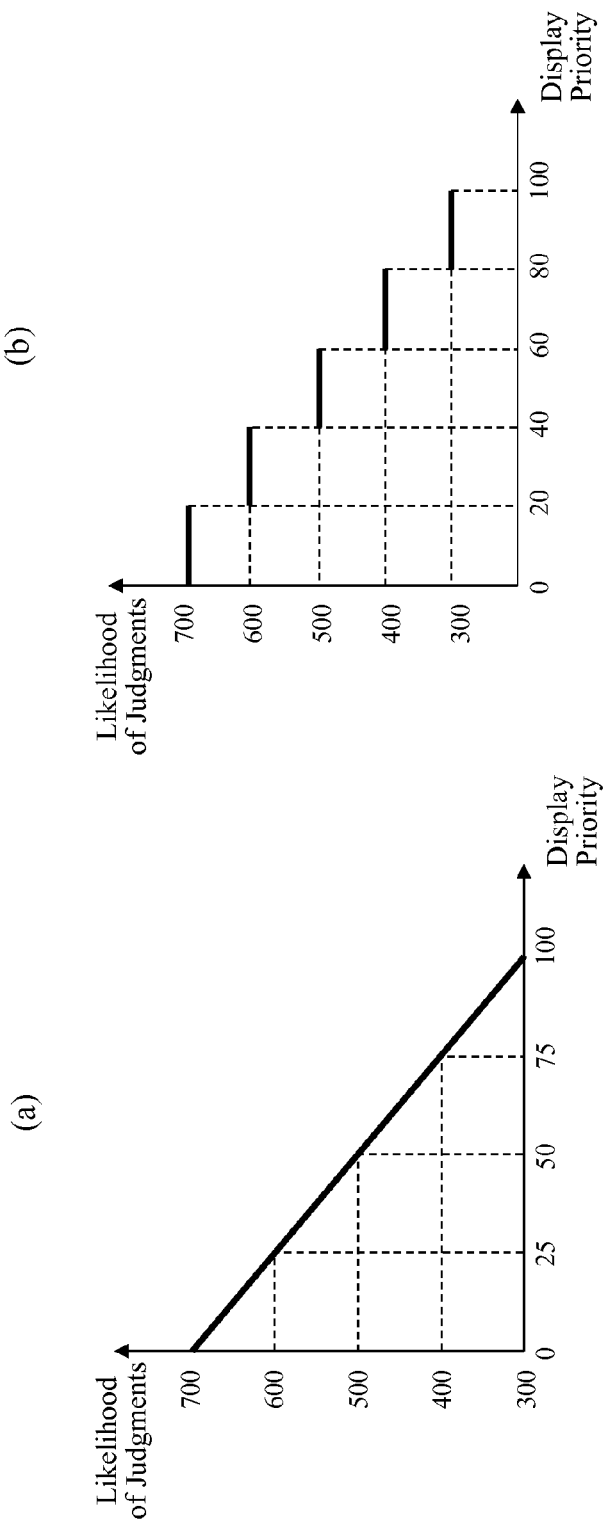
FIG. 14 is a diagram showing a relation between a display priority of a recognition result and a likelihood of judgments.

Hereafter, it is assumed that the likelihood of judgments and the display priority have a negative correlation between them. FIG. 14 is a diagram showing the relation between the display priority of the recognition result, and the likelihood of judgments.

For example, it is assumed that the likelihood of judgments is determined by using a function of "Y=−aX+b" (a and b are positive constants) that makes the likelihood of judgments decrease in proportion to the display priority, where the likelihood of judgments is expressed by Y and the display priority is expressed by X. In the example shown in FIG. 14($a$), the likelihood of judgments is determined on the basis of the following equation: "Y=−4X+700."

As an alternative, the likelihood of judgments can be decreased step by step on the basis of the display priority, as shown in FIG. 14($b$).

Then, on the basis of the relation between the display priority and the likelihood of judgments as shown in FIG. 14, the recognition result output controller 22 can determine the likelihood of judgments corresponding to the display priority calculated by the display priority calculator 21, and sets this likelihood of judgments to the voice recognizer 19.

As a result, because the predetermined likelihood of judgments set to the voice recognizer 19 has a higher value when the display priority is equal to or less than a predetermined value (or less than the predetermined value), the voice recognition device enters a state in which it does not output the recognition result.

The recognition result output controller 22 can stop or restart the recognition process performed by the voice recognizer 19 on the basis of the display priority calculated by the display priority calculator 21 (the same goes for the following embodiments). More specifically, when the display priority is equal to or less than the predetermined value (or less than the predetermined value), the recognition result output controller can stop the recognition process performed by the voice recognizer 19, whereas when the display priority is greater than the predetermined value (or equal to or greater than the predetermined value), the recognition result output controller can restart the recognition process performed by the voice recognizer 19.

Next, processing performed by the navigation device in accordance with Embodiment 1 will be explained by using flow charts shown in FIGS. 15 to 17.

Figure 15:
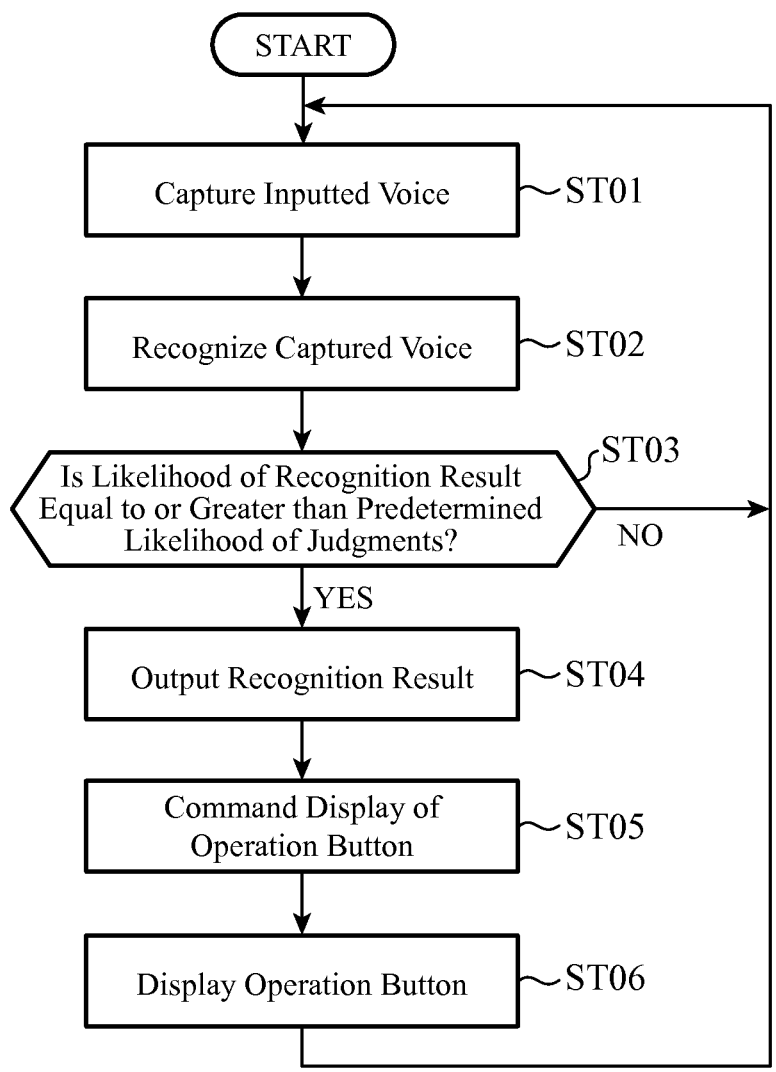
FIG. 15 is a flow chart showing a process of displaying an operation button which is a voice recognition result.

FIG. 15 is a flow chart showing a process of displaying operation buttons 23 which are a voice recognition result.

First, the voice acquirer 18 captures a user's utterance collected by the microphone 8, i.e., an inputted voice, and A/D converts this inputted voice by using, for example, PCM (step ST01).

Next, the voice recognizer 19 detects a voice section corresponding to the contents which the user has uttered from a voice signal which is captured and digitized by the voice acquirer 18, extracts a feature quantity of voice data about this voice section, and performs a recognition process on the basis of the feature quantity and with reference to the voice recognition dictionary 20 (step ST02).

The voice recognizer 19 then determines whether or not the likelihood of the recognition result is equal to or greater than the predetermined likelihood of judgments (or greater than the predetermined likelihood of judgments) (step ST03). When the likelihood of the recognition result is equal to or greater than the predetermined likelihood of judgments (or greater than the predetermined likelihood of judgments) (when YES in step ST03), the voice recognizer outputs the recognition result (step ST04).

After that, the display controller 14 outputs a command for displaying operation buttons 23 corresponding to the recognition result outputted by the voice recognizer 19 in the recognition result display area 24 to the display 15 (step ST05), and the operation buttons 23 are displayed on the display 15 (step ST06).

In contrast, when the likelihood of the recognition result is less than the predetermined likelihood of judgments (or equal to or less than the predetermined likelihood of judgments) (when NO in step ST03), the navigation device returns to the process of step ST01.

Figure 16:
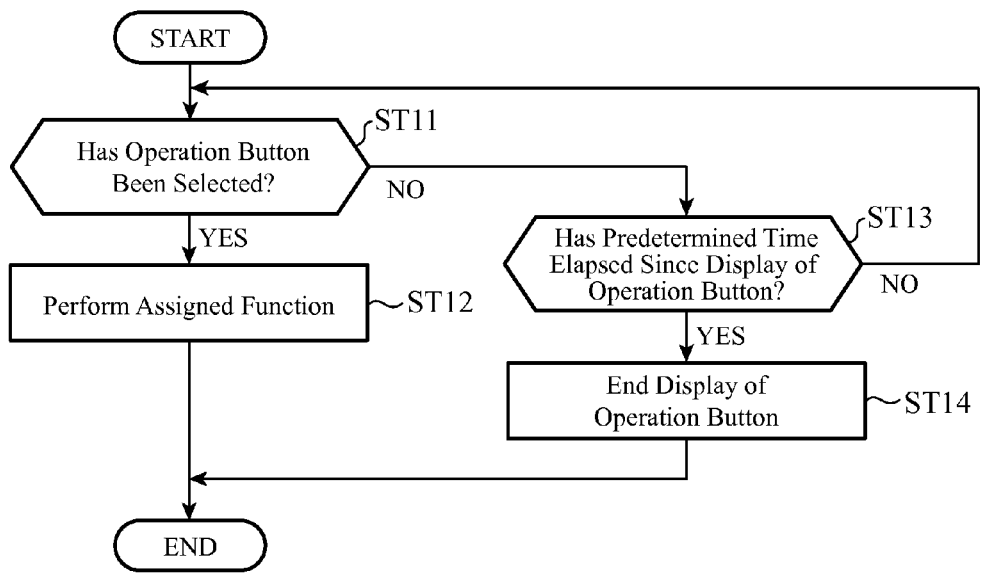
FIG. 16 is a flow chart showing a process after the display of the operation button.

FIG. 16 is a flow chart showing a process after the display of the operation buttons 23.

The controller 1 determines whether or not an operation button 23 currently being displayed has been selected (step ST11). Then, when an operation button 23 has been selected (when YES in step ST11), the controller outputs a command for performing the function assigned to the operation button 23 selected, and performs a process for performing this function (step ST12).

In contrast, when no operation button 23 has been selected (when NO in step ST11), the controller determines, as to each operation button 23 currently being displayed, whether a time which has elapsed after the operation button has been displayed exceeds a predetermined time (step ST13). It is assumed that after each operation button 23 is displayed, the time which has elapsed after the operation button has been displayed is measured.

Then, when the measured time exceeds the predetermined time (when YES in step ST13), the controller outputs a command for ending the display of the operation button 23 to the display controller 14 (step ST14).

In contrast, when the measured time does not exceed the predetermined time (when NO in step ST13), the controller returns to step ST11 and performs a process of determining whether or not the operation button 23 has been selected.

Figure 17:
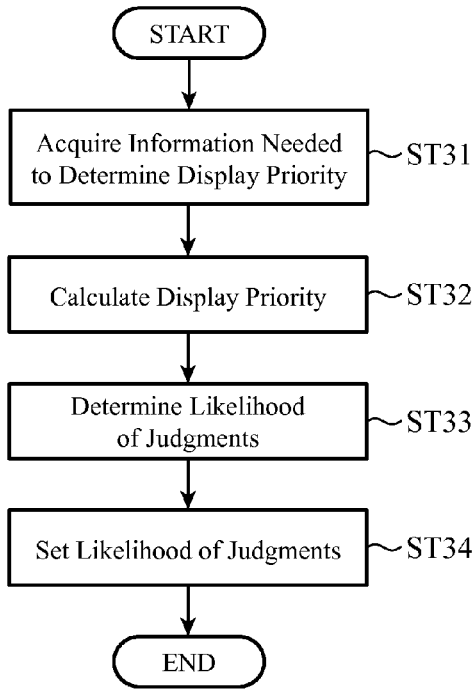
FIG. 17 is a flow chart showing a process of setting a likelihood of judgments.

FIG. 17 is a flow chart showing a process of setting the likelihood of judgments.

First, for each major item (one or more of the above-mentioned items (1) to (8)) which is determined in advance or selected by the user, the display priority calculator 21 acquires information needed to determine the display priority (step ST31), and calculates the display priority on the basis of the acquired information and the predetermined priority adjustment amount (step ST32).

To explain with a concrete example, when, for example, the major item (1) is determined as a determination object, the information needed to determine the display priority in step ST31 is the vehicle position information, the traveling direction of the vehicle, the position of the recognition result display area 24, map information, and traffic information (including congestion information, construction information, etc.), and the display priority calculator 21 acquires these pieces of information (step ST31).

Then, the display priority calculator refers to a table showing a correspondence between information in the traveling direction of the vehicle and a display priority adjustment amount of the recognition result as shown in, for example, FIG. 5, and determines a display priority adjustment amount.

Figure 18:
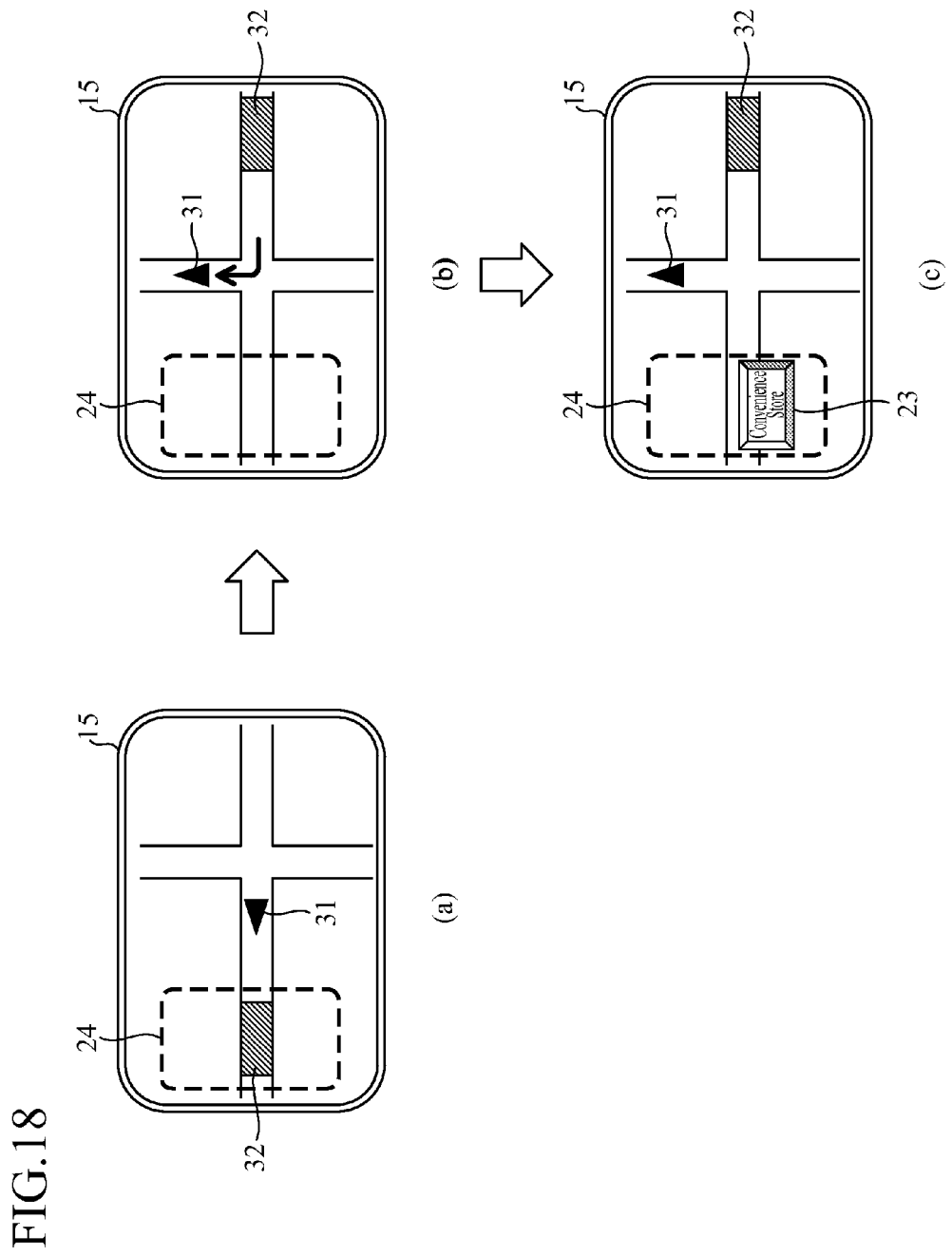
FIG. 18 is a diagram showing the example of a screen transition resulting from a relation between the traveling direction of the vehicle and an operation button which is a recognition result displayed in the recognition result display area in a state in which a map screen is displayed on the display.

Hereafter, an explanation will be made with reference to FIG. 18 by providing a concrete example. FIG. 18 is a diagram showing an example of a screen transition which results from a relation between the traveling direction of the vehicle and the operation buttons which are displayed in the recognition result display area and which are the recognition result in a state in which a map screen is displayed on the display 15. Also in this case, an explanation will be made by assuming that the initial value of the display priority is set to 50.

Although FIG. 18(a) is the same diagram as FIG. 4(d), for example, when a map is displayed while being oriented north-up, the traveling direction of the vehicle 31 is a westward direction, and the recognition result display area 24 is set to be placed in a left portion in the display 15, as shown in FIG. 18(a), the display priority calculator 21 refers to the table of FIG. 5 and determines a display priority adjustment amount to be −30 because the recognition result display area 24 is placed in the traveling direction of the vehicle 31.

Further, in the case of this FIG. 18(a), because congestion information is further displayed in the traveling direction of the vehicle 31, the display priority calculator 21 further determines a display priority adjustment amount to be −10 from the table of FIG. 5.

As a result, the display priority calculator 21 calculates the display priority=the initial value 50+the adjustment amount (−30)+the adjustment amount (−10)=10 (step ST32).

Next, the recognition result output controller 22 determines the likelihood of judgments corresponding to the display priority calculated by the display priority calculator 21 (step ST33), and sets the likelihood of judgments to the voice recognizer 19 (step ST34).

Concretely, the recognition result output controller 22 calculates the likelihood of judgments corresponding to the display priority calculated by the display priority calculator 21 in step ST32 on the basis of a computation expression in the graph shown in FIG. 14(a), i.e., the likelihood of judgments Y=−4X+700 (X is the display priority) (step ST33). As a result, the likelihood of judgments corresponding to the display priority=10 is calculated to be 660, and this likelihood of judgments is set, as the predetermined likelihood of judgments, to the voice recognizer 19 (step ST34).

A concrete example of a display of the recognition result will be explained by providing, as an example, a case in which the user utters, for example, "convenience store" in this state. First, the voice acquirer 18 captures this voice of "convenience store" and A/D converts the voice by using, for example, PCM (step ST01 of FIG. 15). Next, the voice recognizer 19 performs the recognition process on the captured voice, and the words "convenience store" are recognized as the voice (step ST02). In this case, it is assumed that the likelihood of this voice recognition is 520.

In this case, the voice recognizer 19 determines that the likelihood of 520 of the recognition result is the less than the predetermined likelihood of judgments of 660 (when NO in step ST03), and returns to the process of step ST01 without outputting the recognition result.

As a result, an operation button 23 which is the recognition result is not displayed on the display 15, and the navigation device remains in a state in which the display screen shown in FIG. 18(a) is displayed.

It is assumed that, after that, the vehicle enters a state in which it has passed through a traffic congestion zone and changed its traveling direction, and is traveling in a northern direction, as shown in FIG. 18(b). In this case, because the recognition result display area 24 does not exist in the traveling direction of the vehicle 31, a display priority adjustment amount is determined to be 0 as a result of having referred to the table, as shown in FIG. 5, showing the correspondence between information in the traveling direction of the vehicle and a display priority adjustment amount of the recognition result.

As a result, the display priority calculator 21 calculates the display priority=the initial value of 50+the adjustment amount (0)=50 (step ST32).

The recognition result output controller 22 then calculates the likelihood of judgments on the basis of the computation expression in the graph shown in FIG. 14(*a*), i.e., the likelihood of judgments Y=−4X+700 (X is the display priority) (step ST33). As a result, the likelihood of judgments corresponding to the display priority=50 is calculated to be 500, and this likelihood of judgments is set, as the predetermined likelihood of judgments, to the voice recognizer 19 (step ST34).

When the user utters, for example, "convenience store" in this state, like in the case of the example previously shown, the voice acquirer 18 captures this voice of "convenience store" and A/D converts the voice by using, for example, PCM (step ST01 of FIG. 15). Next, the voice recognizer 19 performs the recognition process on the captured voice, and the words "convenience store" are recognized as the voice (step ST02). Also in this case, it is assumed that the likelihood of this voice recognition is 520.

In this case, the voice recognizer 19 determines that the likelihood of 520 of the recognition result is equal to or greater than the predetermined likelihood of judgments of 500 (when YES in step ST03), and outputs the recognition result (step ST04).

Then, the display controller 14 outputs a command for displaying an operation button 23 corresponding to the recognition result of "convenience store" outputted by the voice recognizer 19 in the recognition result display area 24 to the display 15 (step ST05).

As a result, the display 15 displays the operation button 23 which is the voice recognition result of "convenience store", as shown in FIG. 18(*c*) (step ST06).

As mentioned above, in accordance with this Embodiment 1, when the recognition result display area 24 is placed in the traveling direction of the vehicle, when there is either a point shown by a facility genre icon with a high possibility that the user will make a stop or a point set by the user in the recognition result display area 24, and when guidance information/warning information is displayed in the recognition result display area 24, the output frequency of the recognition result is decreased by increasing the likelihood of judgments in the voice recognizer 19; otherwise, the output frequency of the recognition result is increased as a result by decreasing the likelihood of judgments. As a result, when information important for the user is hidden by a display of the recognition result, while the voice recognition device decreases the frequency with which the acquisition of the important information by the user is blocked by suppressing the display of the recognition result, the voice recognition device makes it easier for the user's desire included in the utterance to be displayed as the recognition result and can improve the user's convenience when it is determined that no important information is hidden.

Further, when congestion information is displayed in the traveling direction, because the voice recognition device assumes that the user needs map information greatly, and further decreases the output frequency of the recognition result by further increasing the likelihood of judgments of the voice recognition, the voice recognition device can further improve the user's convenience.

In addition, when determining from the road or the area along or in which the vehicle is traveling, and the graphical scale of the map that the user needs much map information or much information important for the user exists, the voice recognition device decreases the frequency with which the acquisition of the important information by the user is blocked by suppressing the display of the recognition result; otherwise, the voice recognition device makes it easier for the user's desire included in the utterance to be displayed as the recognition result and can improve the user's convenience.

Further, by combining the plurality of above-mentioned major items (1) to (8) and calculating the display priority, the voice recognition device can adjust the output frequency of the recognition result with flexibility according to various conditions.

Although it is explained in this Embodiment 1 that the display priority indicates the degree that the voice recognition result (operation buttons 23) should be displayed with a higher priority than display information (e.g., map information and so on) other than the voice recognition result (operation buttons 23), the display priority can be alternatively set to indicate the degree that information other than the voice recognition result (operation buttons 23) should be displayed with a higher priority than the voice recognition result (operation buttons 23).

In this case, an amount of raise or lowering in the display priority which corresponds to an item determined by the display priority calculator 21 is the inverse of the above-mentioned amount of raise or lowering, the display priority and the likelihood of judgments of the recognition result have a positive correlation between them (the same goes for the following embodiments).

The calculation of the display priority can be performed at all times, or can be performed at predetermined intervals.

Embodiment 2.

Figure 19:
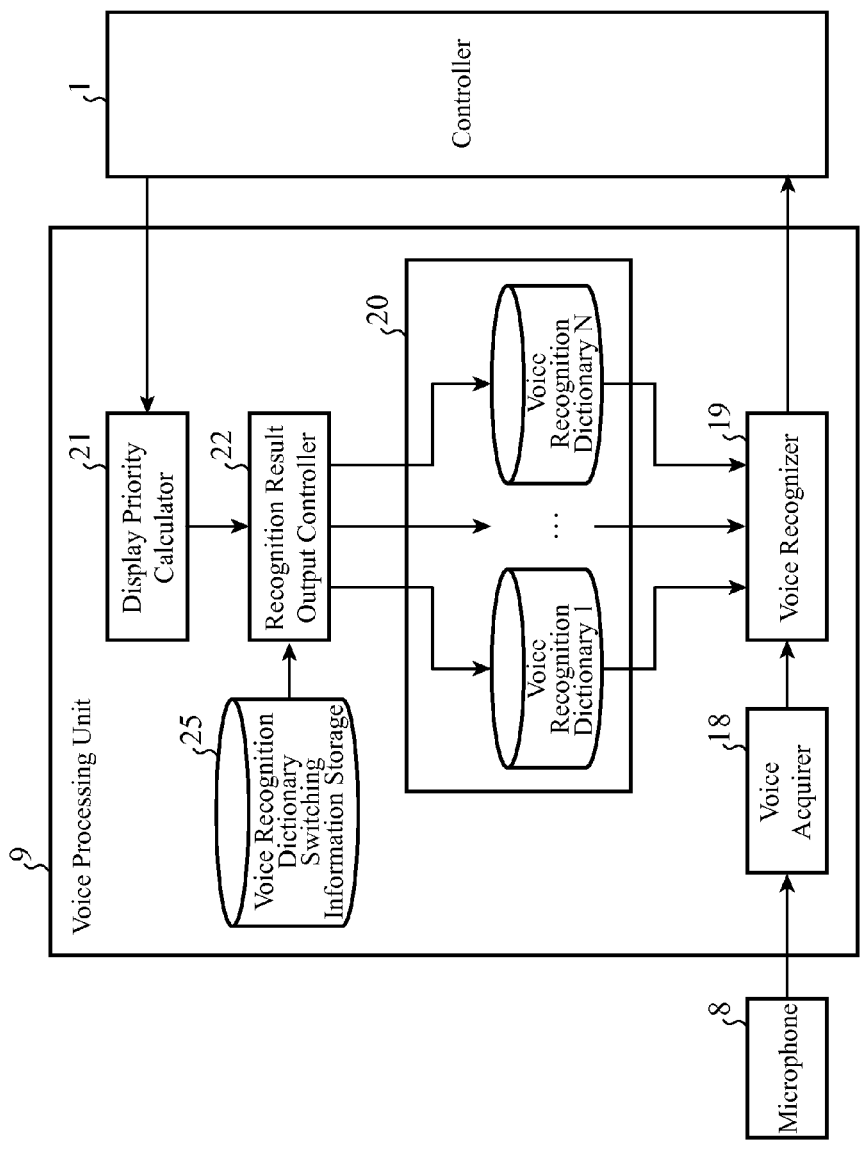
FIG. 19 is a block diagram showing an example of the structure of a voice processing unit in accordance with Embodiment 2.

FIG. 19 is a block diagram showing an example of the structure of a voice processing unit 9 in accordance with Embodiment 2 of the present invention. The same structural components as those explained in Embodiment 1 are designated by the same reference numerals, and the duplicated explanation of the components will be omitted hereafter. The voice processing unit in accordance with Embodiment 2 shown hereafter differs, as compared with that in accordance with Embodiment 1, in that the voice processing unit further includes a voice recognition dictionary switching information storage 25, and a voice recognition dictionary 20 consists of a plurality of voice recognition dictionaries 1 to N. The voice processing unit further differs in that a recognition result output controller 22 determines a voice recognition dictionary name corresponding to a display priority, and switches between the voice recognition dictionaries 20, instead of setting a likelihood of judgments corresponding to the display priority to a voice recognizes 19.

Figures 20, 21:
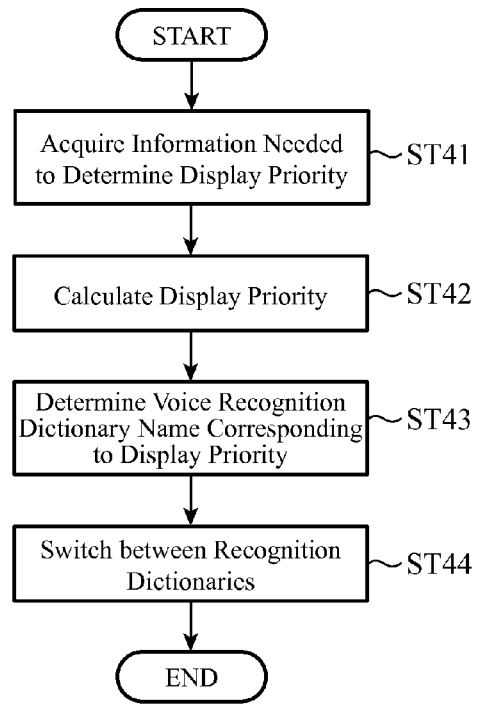
FIG. 20 is a table showing an example of a correspondence among a display priority, a voice recognition dictionary name, and the number of recognized words, which is stored in a voice recognition dictionary switching information storage.
FIG. 21 is a flow chart showing processing performed by a voice recognition device in accordance with Embodiment 2.

The voice recognition dictionary switching information storage 25 stores display priorities and voice recognition dictionary names while bringing the voice recognition dictionary names into correspondence with the display priorities. FIG. 20(*a*) is a table showing an example of the correspondence between the display priority and a voice recognition dictionary name, which is stored in the voice recognition dictionary switching information storage 25. Further, FIG. 20(*b*) is a table showing an example of a correspondence between a voice recognition dictionary name and the number of recognized words stored in the dictionary.

For example, as shown in FIG. 20(*b*), each display priority and the number of recognized words stored in the voice recognition dictionary having the corresponding voice recognition dictionary name have a positive correlation between them. As an alternative, in a case in which each display priority is set to indicate the degree that information other than operation buttons 23 should be displayed with a higher priority than the operation buttons 23, each display priority and the number of recognized words stored in the voice recognition dictionary having the corresponding voice recognition dictionary name have a negative correlation between them.

The recognition result output controller 22 refers to the voice recognition dictionary switching information storage 25, and determines the voice recognition dictionary name corresponding to a display priority outputted by a display priority calculator 21, and switches the voice recognition dictionary 20 which is referred to by the voice recognizer 19 to the voice recognition dictionary 20 having the voice recognition dictionary name. For example, when the display priority is 10, the recognition result output controller switches to the voice recognition dictionary 20 having the voice recognition dictionary name "Adic", and, when the display priority is 50, switches to the dictionary having the voice recognition dictionary name "Cdic."

Next, processing performed by a voice recognition device in accordance with Embodiment 2 will be explained by using a flow chart shown in FIG. 21.

Because steps ST41 and ST42 are the same as steps ST31 and ST32 of Embodiment 1, the explanation of the steps will be omitted.

The recognition result output controller 22 refers to the voice recognition dictionary switching information storage 25, determines the voice recognition dictionary name corresponding to the display priority outputted by the display priority calculator 21 (step ST43), and switches the voice recognition dictionary 20 which is referred to by the voice recognizer 19 to the voice recognition dictionary 20 having the voice recognition dictionary name (step ST44).

As mentioned above, because the voice recognition device in accordance with this Embodiment 2 adjusts the output frequency of the recognition result by switching to the voice recognition dictionary having recognized words whose number depends on the display priority, the voice recognition device can improve the user's convenience, like that in accordance with Embodiment 1.

Embodiment 3.

Figure 22:
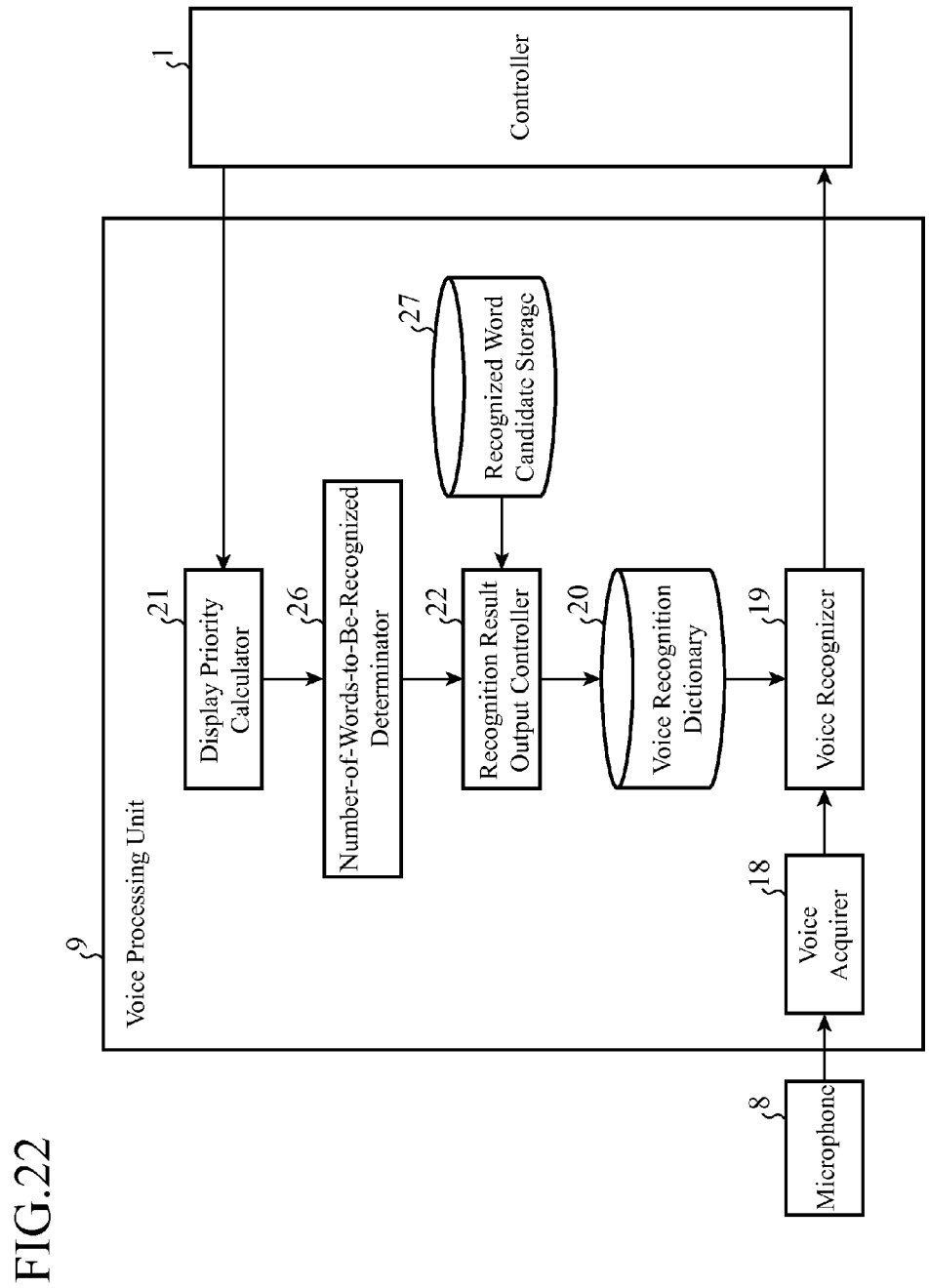
FIG. 22 is a block diagram showing an example of the structure of a voice processing unit in accordance with Embodiment 3.

FIG. 22 is a block diagram showing an example of the structure of a voice processing unit 9 in accordance with Embodiment 3 of the present invention. The same structural components as those explained in Embodiment 1 are designated by the same reference numerals, and the duplicated explanation of the components will be omitted hereafter. The voice processing unit in accordance with Embodiment 3 shown hereafter differs, as compared with that in accordance with Embodiment 1, in that the voice processing unit further includes a number-of-words-to-be-recognized determinator 26 and a recognized word candidate storage 27. Further, the voice processing unit differs in that a recognition result output controller 22 dynamically generates a voice recognition dictionary 20 on the basis of the number of words to be recognized which corresponds to a display priority, instead of setting a likelihood of judgments corresponding to the display priority to a voice recognizer 19.

Figure 23:
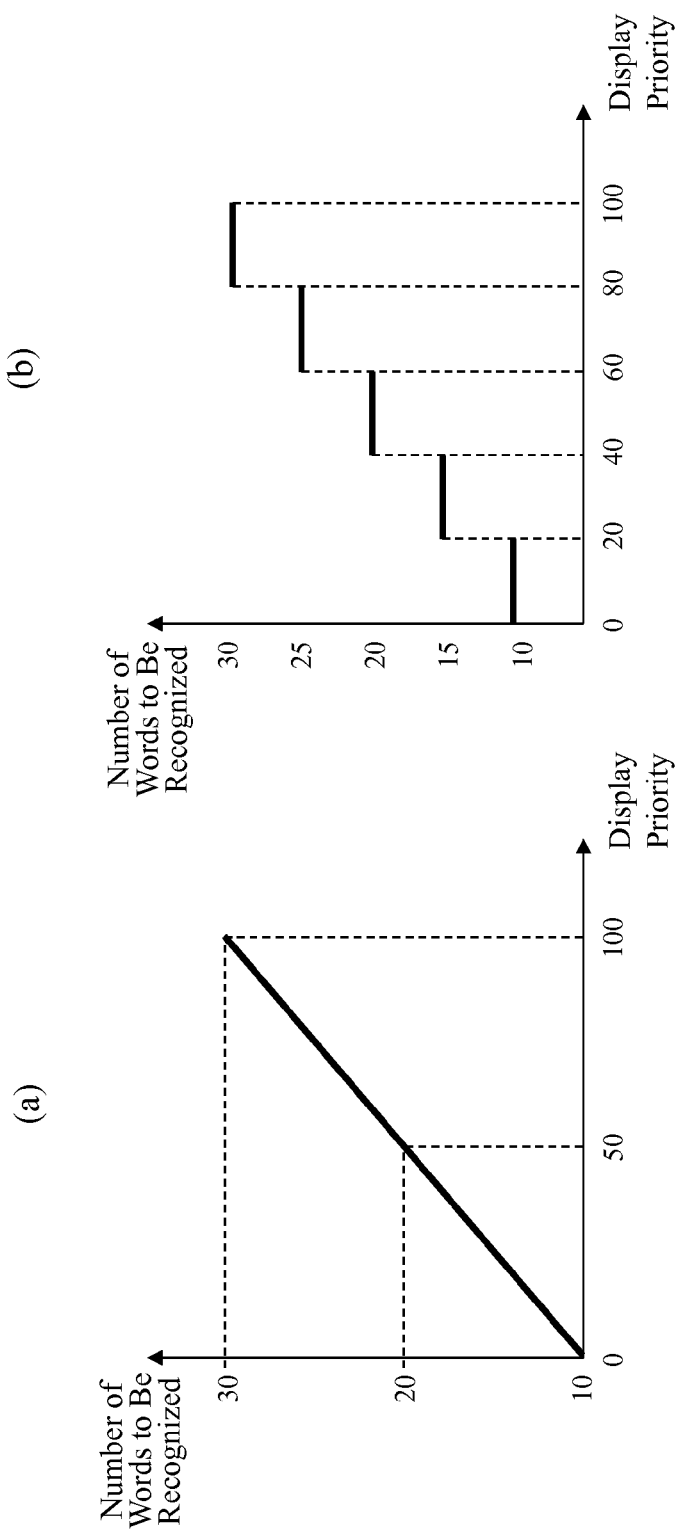
FIG. 23 is a diagram showing a relation between a display priority of a recognition result and the number of words to be recognized.

The number-of-words-to-be-recognized determinator 26 determines the number of words to be recognized which corresponds to a display priority outputted by a display priority calculator 21. Hereafter, it is assumed that the display priority and the number of words to be recognized have a positive correlation between them. FIG. 23 is a diagram showing a relation between a display priority of a recognition result and the number of words to be recognized.

For example, it is assumed that the number of words to be recognized is determined by using a function "Y=cX+d" (c and d are positive constants) that makes the number of words to be recognized increase in proportion to the display priority, where the number of words to be recognized is expressed by Y and the display priority is expressed by X. In an example shown in FIG. 23(*a*), the number of words to be recognized is determined on the basis of the following equation: "Y=0.2X+10."

In this case, the number of words to be recognized can be made to increase step by step on the basis of the display priority, as shown in FIG. 23(*b*).

In a case in which each display priority is set to indicate the degree that information other than operation buttons 23 should be displayed with a higher priority than the operation buttons 23, the display priority and the corresponding number of words to be recognized have a negative correlation between them.

The recognized word candidate storage 27 stores a reading and a recognition rank of each word which is a candidate to be recognized.

Figures 24, 25:
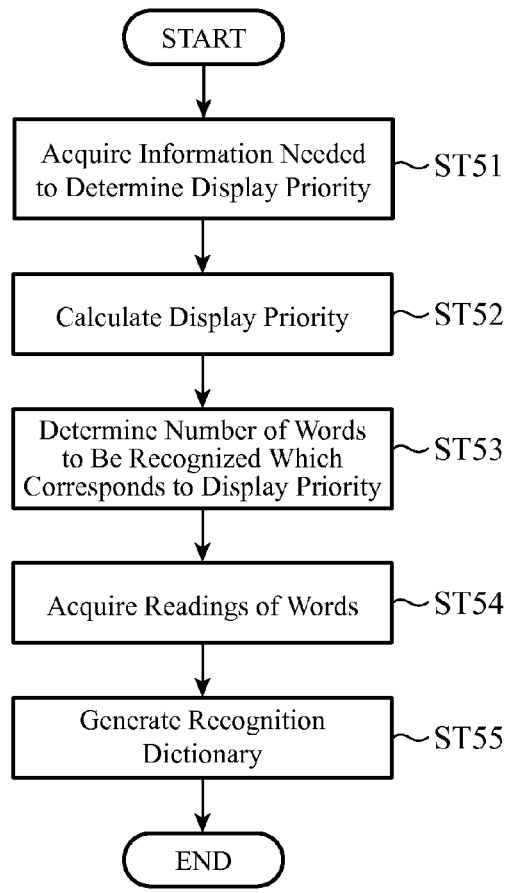
FIG. 24 is a table showing an example of a correspondence between the reading of a word which is stored in a recognized word candidate storage and which is a candidate to be recognized, and a recognition rank.
FIG. 25 is a flow chart showing processing performed by a voice recognition device in accordance with Embodiment 3.

The recognition rank indicates a degree of probability that the recognition result output controller 22, which will be mentioned later, selects the word, and it is assumed that the lower the recognition rank of a word, the higher the probability that the word is selected. FIG. 24 is a table showing an example of a correspondence between the reading and the recognition rank of a word which is stored in the recognized word candidate storage 27 and which is a candidate to be recognized.

Although an explanation will be made hereafter by assuming that the lower the recognition rank of a word, the higher the probability that the word is selected, operation buttons 23 can be made to be hardly displayed by making a word be selected with a lower probability with decrease in its recognition rank. As an alternative, the recognition rank can be fixed or the storing of the recognition rank can be omitted.

Instead of the recognition rank, the number of times that recognition has been performed can be stored for each word, and it can be configured that the higher the number of times that recognition has been performed, the higher the probability that the word is selected, while the lower the number of times that recognition has been performed, the lower the probability that the word is selected.

In this case, what is necessary is just to provide a configuration that includes a number-of-times-of-recognition setter (not shown) that searches through the recognized word candidate storage 27 by using, as a search key, the recognition result outputted by the voice recognizer 19, and that increments the number of times of recognition which corresponds to a matching word.

The recognition result output controller 22 acquires the readings of words whose number is determined by the number-of-words-to-be-recognized determinator 26 from the recognized word candidate storage 27 in ascending order of their recognition ranks or in descending order of the number of times of recognition. The recognition result output controller then generates a voice recognition dictionary 20 dynamically by using the acquired readings of the words.

Further, when no recognition rank is stored in the recognized word candidate storage 27, the recognition result output controller can acquire the readings of words whose number is determined by the number-of-words-to-be-recognized determinator 26 at random.

Next, processing performed by a voice recognition device in accordance with Embodiment 3 will be explained by using a flow chart shown in FIG. 25.

Because steps ST51 and ST52 are the same as steps ST31 and ST32 of Embodiment 1, the explanation of the steps will be omitted.

The number-of-words-to-be-recognized determinator 26 determines the number of words to be recognized which corresponds to the display priority outputted by the display priority calculator 21 (step ST53). The recognition result output controller 22 then acquires the readings of words whose number is determined by the number-of-words-to-be-recognized determinator 26 from the recognized word candidate storage 27 in ascending order of their recognition ranks (step ST54), and generates a voice recognition dictionary by using the acquired readings of the words (step ST55).

As mentioned above, because the voice recognition device in accordance with this Embodiment 3 adjusts the output frequency of the recognition result by dynamically generating a voice recognition dictionary having recognized words whose number depends on the display priority, the voice recognition device can improve the user's convenience, like that in accordance with Embodiment 1.

Embodiment 4.

Although the case of applying the voice recognition device in accordance with the present invention to a navigation device mounted in a moving object, such as a vehicle, is explained, as an example, in Embodiments 1 to 3, the application is not limited to a navigation device for vehicles. The voice recognition device can be applied to a navigation device for moving objects including persons, vehicles, railroads, ships, or airplanes, or can be applied to a server for a voice recognition system and a server for a navigation system. Further, the voice recognition device can be applied to a system in any form, such as an application for a voice recognition system, an application for a navigation system, etc. which are installed in mobile information terminals, such as smart phones, tablet PCs, and mobile phones.

Figure 26:
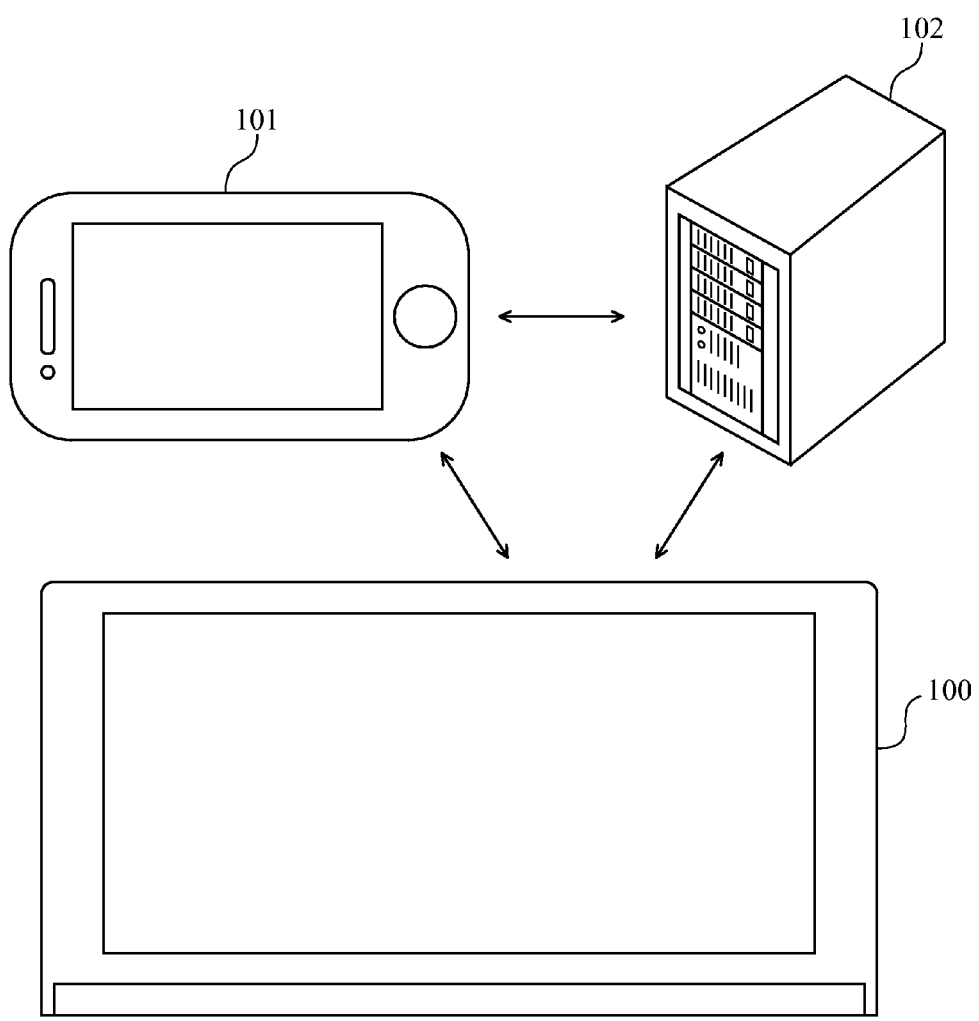
FIG. 26 is a diagram showing an outline of a navigation system in accordance with Embodiment 4.

FIG. 26 is a diagram showing an outline of a navigation system in accordance with Embodiment 4 of the present invention. This navigation system can have one of various forms including a form in which a vehicle-mounted unit 100 performs a voice recognition process and a navigation process in cooperation with at least one of a mobile information terminal 101, such as a smart phone, and a server 102, and a form in which at least one of the mobile information terminal 101, such as a smart phone, and the server 102 performs a voice recognition process and a navigation process, and causes the vehicle-mounted unit 100 to display a recognition result and map information. Hereafter, the configuration of the navigation system will be explained.

Although the explanation is made in Embodiments 1 to 3 by assuming that the vehicle-mounted unit 100 shown in FIG. 26 has all of the functions of the voice recognition device in accordance with the present invention, a case in which, in the navigation system in accordance with this Embodiment 4, the server 102 performs a voice recognition process and causes the vehicle-mounted unit 100 to display a recognition result, thereby providing the recognition result for the user, and a case in which, in the navigation system, the mobile information terminal 101 performs a voice recognition process in cooperation with the server 102, and causes the vehicle-mounted unit 100 to display a recognition result, thereby providing the recognition result for the user will be explained.

First, the case in which the server 102 performs a voice recognition process and causes the vehicle-mounted unit 100 to display a recognition result, i.e., a case in which the vehicle-mounted unit 100 functions as a display device in cooperation with the server 102 having a voice recognition function will be explained.

In this configuration, there can be considered a case in which the vehicle-mounted unit 100 communicates directly with the server 102, or the vehicle-mounted unit 100 communicates with the server 102 via the mobile information terminal 101. The server 102 functions as a voice recognition device equipped with the voice processing unit 9 explained in any of above-mentioned Embodiments 1 to 3. Further, the vehicle-mounted unit 100 functions as a display device provided with at least a display 15 for providing the user with a recognition result provided by the server 102.

In this case, the vehicle-mounted unit 100 has only a communication function and a display function basically, and receives a voice recognition result provided by the server 102 and provides the user with the voice recognition result.

More specifically, the server 102 is a voice recognition device that includes components other than the display 15, and the server 102 which is this voice recognition device recognizes a voice uttered by the user, and causes the vehicle-mounted unit 100 which is the display device to display a recognition result.

Even though the navigation system is configured in this way, the navigation system can provide the same advantages as those provided by any of Embodiments 1 to 3.

Further, the case in which the mobile information terminal 101 performs a voice recognition process in cooperation with the server 102, and the vehicle-mounted unit 100 provides the user with a recognition result will be explained.

In this configuration, there can be considered a case in which the vehicle-mounted unit 100 communicates with the server 102 via the mobile information terminal 101, and an application for the mobile information terminal 101 performs a voice recognition process in cooperation with the server 102. Further, the vehicle-mounted unit 100 functions as a display device provided with at least a display 15 for providing the user with a recognition result provided by the mobile information terminal 101 and the server 102.

Also in this case, the vehicle-mounted unit 100 has only a communication function and a display function basically, and receives a voice recognition result which is provided by the mobile information terminal 101 and the server 102 in cooperation with each other and provides the user with the voice recognition result.

More specifically, by using the application for the mobile information terminal 101, the navigation system causes the vehicle-mounted unit 100 which is the display device to display a recognition result which is acquired by recognizing a voice uttered by the user.

Even though the navigation system is configured in this way, the navigation system can provide the same advantages as those provided by any of Embodiments 1 to 3.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

The voice recognition device in accordance with the present invention can be applied to a navigation device mounted in a moving object, such as a vehicle, a server for a vehicle-mounted information providing system, an application for a navigation system installed in mobile information terminals, such as smart phones, tablet PCs, and mobile phones, etc., and so on.

EXPLANATIONS OF REFERENCE NUMERALS

1 controller, 2 GPS receiver, 3 self-contained navigation sensor, 4 current position detector, 5 traffic information transmitter and receiver, 6 route determining unit, 7 route guidance unit, 8 microphone, 9 voice processing unit, 10 voice synthesis unit, 11 map information storage, 12 map information acquirer, 13 command input unit, 14 display controller, 15 display, 16 voice controller, 17 speaker, 18 voice acquirer, 19 voice recognizes, 20 voice recognition dictionary, 21 display priority calculator, 22 recognition result output controller, 23 operation button (recognition result), 24 recognition result display area, 25 voice recognition dictionary switching information storage, 26 number-of-words-to-be-recognized determinator, 27 recognized word candidate storage, 31 vehicle, 32 display of congestion information, 33 facility icon, 34 guidance display, 35 warning display, 100 vehicle-mounted unit, 101 mobile information terminal, 102 server.

The invention claimed is:

1. A voice recognition device that recognizes a voice uttered by a user and displays an operation button to which a function corresponding to a recognition result is assigned, said voice recognition device comprising:
a voice acquirer to detect and acquire a voice uttered by said user;
a voice recognizer to refer to a voice recognition dictionary, recognize voice data acquired by said voice acquirer, and output a recognition result;
a display to display an operation button to which a function corresponding to the recognition result outputted by said voice recognizer is assigned;
a display controller to output a command for displaying the operation button to which the function corresponding to the recognition result outputted by said voice recognizer is assigned in a recognition result display area of said display;
a display priority calculator to calculate a display priority for said operation button corresponding to said recognition result, said display priority indicating a degree that said operation button should be displayed in preference to information other than said operation button in said recognition result display area, said display priority for said operation button corresponding to said recognition result being calculated to reflect whether display of said operation button would distract from other display information that would be important to the user; and
a recognition result output controller to increase a display frequency of said operation button with increase in the display priority calculated by said display priority calculator by decreasing an output frequency of said information other than said operation button,
wherein said voice recognition device is applied to a navigation device that displays a map on said display and provides route guidance for a moving object, and said display priority calculator calculates said display priority on a basis of a positional relationship between a traveling direction of said moving object displayed on said display and said recognition result display area, such that said display priority calculator decreases display priority for said operation button corresponding to said recognition result when the traveling direction of said moving object is aligned with said recognition result display area.

2. The voice recognition device according to claim 1, wherein said voice recognizer refers to said voice recognition dictionary, recognizes the voice data acquired by said voice acquirer, and outputs the recognition result at all times, even if a voice recognition process start command is not provided by a user.

3. The voice recognition device according to claim 1, wherein said voice recognizer outputs a recognition result having a likelihood greater than a likelihood of judgments, and said recognition result output controller increases the display frequency of said operation button with increase in the display priority calculated for said operation button by said display priority calculator by decreasing said likelihood of judgments of said voice recognizer.

4. The voice recognition device according to claim 1, wherein said voice recognizer outputs a recognition result which said voice recognizer acquires by referring to one of a plurality of voice recognition dictionaries in which numbers of recognized words stored therein differ from one another, and performing recognition, and said recognition result output controller increases the display frequency of said operation button with increase in the display priority calculated for said operation button by said display priority calculator by switching the voice recognition dictionary which is referred to by said voice recognizer to a voice recognition dictionary in which a smaller number of recognized words are stored therein.

5. The voice recognition device according to claim 1, wherein said voice recognition device includes:
a number-of-words-to-be-recognized determinator to decrease a number of words which are objects to be recognized in said voice recognizer with increase in the display priority calculated for said operation button by said display priority calculator; and
a recognized word candidate storage to store readings of words which are objects to be recognized in said voice recognizer, and wherein
said recognition result output controller increases the display frequency of said operation button with increase in said display priority for said operation button by acquiring words whose number of words is determined by said number-of-words-to-be-recognized determinator from said recognized word candidate storage, and generating said voice recognition dictionary by using said acquired words.

6. The voice recognition device according to claim 5, wherein said recognized word candidate storage stores recognition ranks while bringing them into correspondence with the readings of said words, respectively, and said recognition result output controller acquires the readings of said words from said recognized word candidate storage on a basis of said recognition ranks.

7. The voice recognition device according to claim 5, wherein said recognized word candidate storage stores numbers of times of recognition while bringing them into correspondence with the readings of said words, respectively, and wherein said voice recognition device further includes a number-of-times-of-recognition setter to search through said recognized word candidate storage by using, as a search key, the recognition result outputted by said voice recognizer, and increase a number of times of recognition corresponding to a reading of a word matching the search key, and said recognition result output controller acquires the readings of said words from said recognized word candidate storage on a basis of said number of times of recognition.

8. The voice recognition device according to claim 1, wherein said recognition result output controller stops and restarts the recognition process performed by said voice recognizer on a basis of the display priority calculated by said display priority calculator.

9. The voice recognition device according to claim 1, wherein said display priority calculator calculates said display priority on a basis of a display state of traffic information on said map in said recognition result display area.

10. The voice recognition device according to claim 1, wherein said display priority calculator calculates said display priority on a basis of a display state of icons on said map in said recognition result display area.

11. The voice recognition device according to claim 10, wherein when said icons are displayed in said recognition result display area, said display priority calculator raises said display priority to a higher value than that when said icons are not displayed.

12. The voice recognition device according to claim 10, wherein said display priority calculator calculates said display priority in such a way that a number of said icons displayed in said recognition result display area and said display priority have a positive correlation between them.

13. The voice recognition device according to claim 1, wherein said display priority calculator calculates said display priority on a basis of a type of a road along which said moving object is traveling.

14. The voice recognition device according to claim 1, wherein said display priority calculator calculates said display priority on a basis of a type of an area in which said moving object is traveling.

15. The voice recognition device according to claim 1, wherein said display priority calculator calculates said display priority on a basis of a graphical scale of the map displayed on said display.

16. The voice recognition device according to claim 1, wherein said display priority calculator calculates said display priority on a basis of a display state of a guidance/warning display on said map in said recognition result display area.

17. The voice recognition device according to claim 1, wherein said display priority calculator calculates said display priority on a basis of a relation between contents of said operation button displayed in said recognition result display area and a display screen displayed on said display.

18. A voice recognition device that recognizes a voice uttered by a user and displays an operation button to which a function corresponding to a recognition result is assigned on a display device, said voice recognition device comprising:
  a voice acquirer to acquire a voice uttered by said user;
  a voice recognizer to refer to a voice recognition dictionary, recognize voice data acquired by said voice acquirer, and output a recognition result;
  a display controller to output a command for displaying an operation button to which a function corresponding to the recognition result outputted by said voice recognizer is assigned in a recognition result display area of said display device;
  a display priority calculator to calculate a display priority for said operation button corresponding to said recognition result, said display priority indicating a degree that said operation button should be displayed in preference to information other than said operation button in said recognition result display area, said display priority for said operation button corresponding to said recognition result being calculated to reflect whether display of said operation button would distract from other display information that would be important to the user; and
  a recognition result output controller to increase a display frequency of said operation button with increase in the display priority calculated by said display priority calculator by decreasing an output frequency of said information other than said operation button,
  wherein said voice recognition device is applied to a navigation device that displays a map on said display and provides route guidance for a moving object, and said display priority calculator calculates said display priority on a basis of a positional relationship between a traveling direction of said moving object displayed on said display and said recognition result display area, such that said display priority calculator decreases display priority for said operation button corresponding to said recognition result when the traveling direction of said moving object is aligned with said recognition result display area.

19. A voice recognition method of recognizing a voice uttered by a user and displaying an operation button to which a function corresponding to a recognition result is assigned on a display device, which a voice recognition device uses, said voice recognition method comprising:
  acquiring a voice uttered by said user;
  referring to a voice recognition dictionary, recognizing voice data acquired, and outputting a recognition result;
  outputting a command for displaying an operation button to which the function corresponding to the recognition result outputted is assigned in a recognition result display area of said display device;
  calculating a display priority for said operation button corresponding to said recognition result, said display priority indicating a degree that said operation button should be displayed in preference to information other than said operation button in said recognition result display area, said display priority for said operation button corresponding to said recognition result being calculated to reflect whether display of said operation button would distract from other display information that would be important to the user; and
  increasing a display frequency of said operation button with increase in the display priority calculated by decreasing an output frequency of said information other than said operation button,
  wherein said voice recognition method is applied to a navigation device that displays a map on said display device and provides route guidance for a moving object, and said calculating a display priority calculates said display priority on a basis of a positional relationship between a traveling direction of said moving object displayed on said display device and said recognition result display area, such that said calculating display priority decreases display priority for said operation button corresponding to said recognition result when the traveling direction of said moving object is aligned with said recognition result display area.

* * * * *